| (12) | United States Patent | (10) Patent No.: | US 11,438,725 B2 |
|---|---|---|---|
| | Ashkenazi et al. | (45) Date of Patent: | Sep. 6, 2022 |

(54) SITE SELECTION FOR DISPLAY OF INFORMATION

(71) Applicant: EVERYSIGHT LTD., Haifa (IL)

(72) Inventors: Asaf Ashkenazi, Haifa (IL); Hanan Shamir, Haifa (IL); Ari Abramson, Haifa (IL); Shmuel Akerman, Haifa (IL)

(73) Assignee: EVERYSIGHT LTD., Haifa (IL)

( * ) Notice: Subject to any disclaimer, the term of this patent is extended or adjusted under 35 U.S.C. 154(b) by 0 days.

(21) Appl. No.: 16/766,704

(22) PCT Filed: Nov. 22, 2018

(86) PCT No.: PCT/IL2018/051273
§ 371 (c)(1),
(2) Date: May 25, 2020

(87) PCT Pub. No.: WO2019/102472
PCT Pub. Date: May 31, 2019

(65) Prior Publication Data
US 2020/0296536 A1  Sep. 17, 2020

(30) Foreign Application Priority Data

Nov. 23, 2017 (IL) .......................................... 255891

(51) Int. Cl.
*H04W 4/021* (2018.01)
*G06T 19/00* (2011.01)
*G02B 27/01* (2006.01)

(52) U.S. Cl.
CPC .......... *H04W 4/021* (2013.01); *G02B 27/017* (2013.01); *G06T 19/006* (2013.01)

(58) Field of Classification Search
None
See application file for complete search history.

(56) References Cited

U.S. PATENT DOCUMENTS 7,101,284 B2   9/2006  Kake et al.
9,346,365 B1 *  5/2016  Penilla .................... B60L 53/14
(Continued)

FOREIGN PATENT DOCUMENTS

JP  2005173042  6/2005

OTHER PUBLICATIONS

International Search Report for PCT Application No. PCT/IL2018/051273, dated Feb. 24, 2019.

(Continued)

*Primary Examiner* — David H Chu
(74) *Attorney, Agent, or Firm* — Pearl Cohen Zedek Latzer Baratz LLP

(57) ABSTRACT

A system and a method are provided for selecting a site for displaying information to a user in a geographical area including a plurality of sites at which information may be displayed. Position, orientation and optionally gaze direction data are received from headsets worn by a plurality of users in the geographical area. The data is analyzed to determine for each site a probability of the site being viewed by users in said geographical area. A request is received for a selection of a site at which to display information to a particular user wearing a headset. The request identifies the headset and includes position of said particular user. In response to a request, a site is selected based on the analysis and signal identifying the selected site is output.

16 Claims, 17 Drawing Sheets

(56) References Cited

U.S. PATENT DOCUMENTS

| | | | |
|---|---|---|---|
| 9,648,581 B1* | 5/2017 | Vaynblat | G06Q 50/01 |
| 10,600,077 B2* | 3/2020 | Arshad | G06Q 30/0246 |
| 10,963,926 B1* | 3/2021 | Nath | G06Q 30/0276 |
| 2002/0103617 A1 | 8/2002 | Uchiyama et al. | |
| 2007/0035563 A1 | 2/2007 | Biocca et al. | |
| 2011/0018903 A1* | 1/2011 | Lapstun | G06F 3/011 |
| | | | 345/633 |
| 2011/0161163 A1 | 6/2011 | Carlson et al. | |
| 2011/0213664 A1 | 9/2011 | Osterhout et al. | |
| 2014/0130076 A1* | 5/2014 | Moore | H04N 21/812 |
| | | | 725/19 |
| 2014/0186026 A1* | 7/2014 | Oshima | H04B 10/116 |
| | | | 398/25 |
| 2014/0274145 A1* | 9/2014 | Cronin | H04W 4/021 |
| | | | 455/456.3 |
| 2014/0321698 A1* | 10/2014 | Chao | G06T 7/20 |
| | | | 382/103 |
| 2015/0058102 A1* | 2/2015 | Christensen | G06F 3/04847 |
| | | | 705/14.6 |
| 2016/0055671 A1 | 2/2016 | Menozzi et al. | |
| 2016/0180374 A1* | 6/2016 | Cetintas | G06Q 30/0244 |
| | | | 705/14.43 |
| 2016/0364756 A1* | 12/2016 | Kim | H04L 43/16 |
| 2016/0370584 A1* | 12/2016 | Teller | G06Q 30/0254 |

OTHER PUBLICATIONS

Office Action for IL Patent Application No. 255891, dated Apr. 17, 2018.

* cited by examiner

SITE SELECTION FOR DISPLAY OF INFORMATION

CROSS-REFERENCE TO RELATED APPLICATIONS

This application is a National Phase Application of PCT International Application No. PCT/IL2018/051273, International Filing Date Nov. 22, 2018, entitled: "SITE SELECTION FOR DISPLAY OF INFORMATION", published on May 31, 2019, under PCT International Application Publication No. WO 2019/102472, which claims the priority of Israel Patent Application No. 255891, filed on Nov. 23, 2017, which is hereby incorporated by reference in its entirety.

FIELD OF THE INVENTION

The present invention relates generally to the field of communication via information displays.

BACKGROUND OF THE INVENTION

Information may be displayed to users in various ways. The anticipated popularity of augmented reality "AR" headsets opens up new possibilities for communicating information to users.

SUMMARY OF THE INVENTION

Some embodiments of the invention generally relate to the selection of a site at which to display information to users in order to maximize the likelihood of it being seen and thereby improve the effectiveness of communicating the information. Embodiments of the invention may be particularly useful for communicating with individuals in emergency situations, either individuals or groups of users, as well as for commercial uses such as advertising and gaming.

Some embodiments of the present invention provide systems and methods for selecting a site for displaying information to a user in a geographical area, wherein the geographical area includes a plurality of sites at which information may be displayed. Position and orientation data may be received from headsets, also known as head-mounted devices or "HMDs", worn by a plurality of users in the geographical area. This data may be received for example at a site selection server. This data may be analyzed and used to determine for each site a probability of the site being viewed by users in the geographical area. Then a request may be received for a selection of a site at which to display information to a particular user. The particular user may be wearing a headset or carrying other user equipment such as a smart phone. The request may identify the user equipment, e.g. headset, and include position data of the particular user. A site may be selected and a signal identifying the selected site may be output. The signal may for example be transmitted to the user equipment. A controller in the user equipment may control an optical display system to display information to the user so that it appears at the selected site, for example using AR as described further herein. According to some embodiments of the invention, the signal may be sent to another entity which may then use the selected site to display information to users. The user equipment may comprise a headset in which case the user may see the displayed information on looking in the direction of the site. The user equipment may comprise a device such as a smart phone or other device having image capturing capability and the information may be displayed to the user when image capturing, e.g. a camera, is operational, and the device is pointed in the direction of the site.

According to some embodiments of the invention, instead of or in addition to a request relating to a particular user, a request may be received for a selection of a site at which to display information to a group of users. The request may identify an area in which the group of users may be present and a site may be selected according to any of the methods described herein.

Some embodiments of the invention described herein relate to the collection and analysis of data received from one or more sensors in a headset, for example for the purpose of determining the probability of a site being viewed.

These additional, and/or other aspects and/or advantages of the present invention are set forth in the detailed description which follows.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

DETAILED DESCRIPTION OF THE INVENTION

Figure 1A:
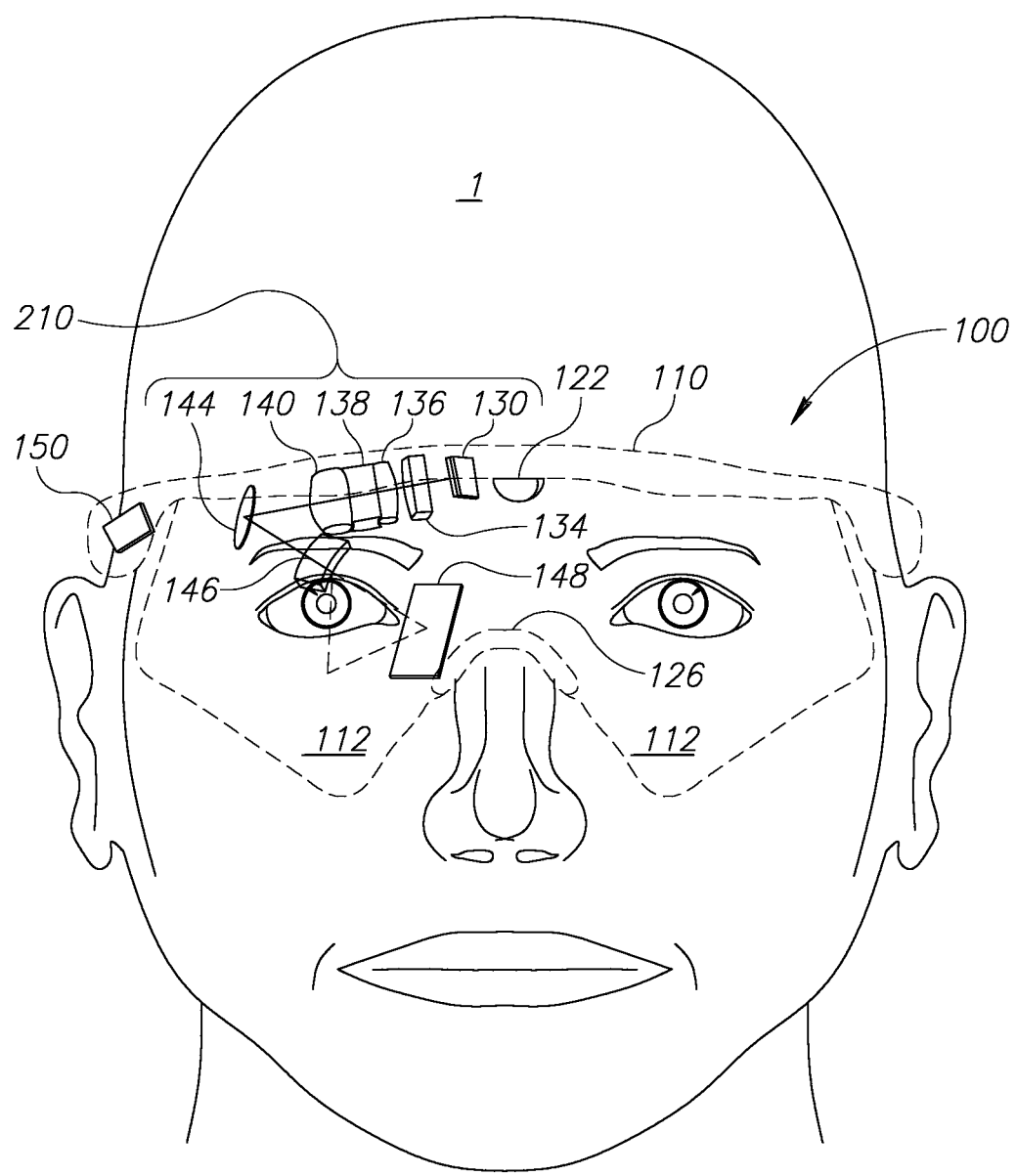
FIGS. 1A, 1B and 1C are respectively a front view of a HMD according to some embodiments of the invention mounted on the head of a user, a detailed view of an optical display system of the HMD of FIG. 1A, and a side view corresponding to FIG. 1A.

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

The term "user" as used herein unless otherwise stated may refer to a wearer, or carrier, of a headset from which data may be received and analyzed, or to a user to whom information is to be displayed. The latter may be wearing a headset according to some embodiments of the invention, or not according to others. The terms "HMD" and "headset" are used herein interchangeably unless otherwise stated.

Some embodiments of the invention may be used to provide an augmented reality "AR" experience to a user. For example a user may wear a headset which in one mode of operation permits a normal view of a scene as would be visible without the headset and which in another mode of operation displays to a user additional information, for example overlaid on the normal view. The headset may be in the form of goggles or glasses. The information displayed to a user may be in any form and may come from one or more of a variety of sources. For example some embodiments of the invention may be used to display short message service "SMS" or other forms of text message to a user, which may be received or retrieved from an SMS server. Some embodiments of the invention may be used to display advertisements to one or more users. Some embodiments of the invention may be used to display emergency information to one or more users, such as information relating to the evacuation of an area.

It should be noted here that when information is presented to a user by display on a headset the user may be required to look in a particular direction in order to see the information. For example, in some AR systems, just as a user may have to look in a certain direction to get a real view of a building, the user may have to look in the same direction to see AR information overlaid on the building. The fact that the user is presented with virtual or synthetic information in addition to a real world view does not guarantee that the user looks at it. Therefore it is useful to determine whether a user presented with AR information looked in the correct direction to see it.

Embodiments of the invention are not limited to AR or presenting information to users via headsets. Embodiments of the invention may be used for "real" as opposed to virtual displays of information to users. For example, embodiments of the invention may provide a potentially improved method of identifying advertising sites, for example for use as display hoardings. Thus some embodiments of the invention provide a method of selecting a site for displaying information to multiple users in a geographical area including a plurality of sites at which information may be displayed. The method may comprise receiving position, orientation and possibly also gaze direction data from headsets carried by a plurality of users which may then be analyzed in any of the ways described herein. The analysis may be used to determine, for each site, a probability of the site being viewed by users in said geographical area. Then a request for a selection of a site may be received. The request might identify a general area in which users are expected to be present. The analysis already carried out may then be used to select a site. Information may be communicated from the site in traditional form, e.g. posters, or by projection, or in any other manner that does not require the user to have a headset. Alternatively, such information may be communicated, e.g. displayed, to one or more users via a headset, for example in the form of augmented reality. Thus some embodiments of the invention may comprise displaying information to a particular user via a display in the headset of the user.

Some embodiments of the invention may provide a server including one or more processors implementing an algorithm by which they are configured to operate a method as described herein to output a selection of a site, which may then be used by a third-party server, operated by such as but not limited to an emergency service, advertising service or SMS service, to communicate information via the selected site. For example a message may be sent to a headset containing the information to be communicated and the identity of a selected site to enable the headset to display the information to the user. Some embodiments of the invention may provide the algorithm, for example in the form of a transitory or non-transitory computer readable medium comprising instructions to be implemented in a computer system such as a server.

Some embodiments of the invention may include displaying information to said particular user via a display in the headset of the particular user, for example in a system including an information server and one or more headsets.

Figure 1B:
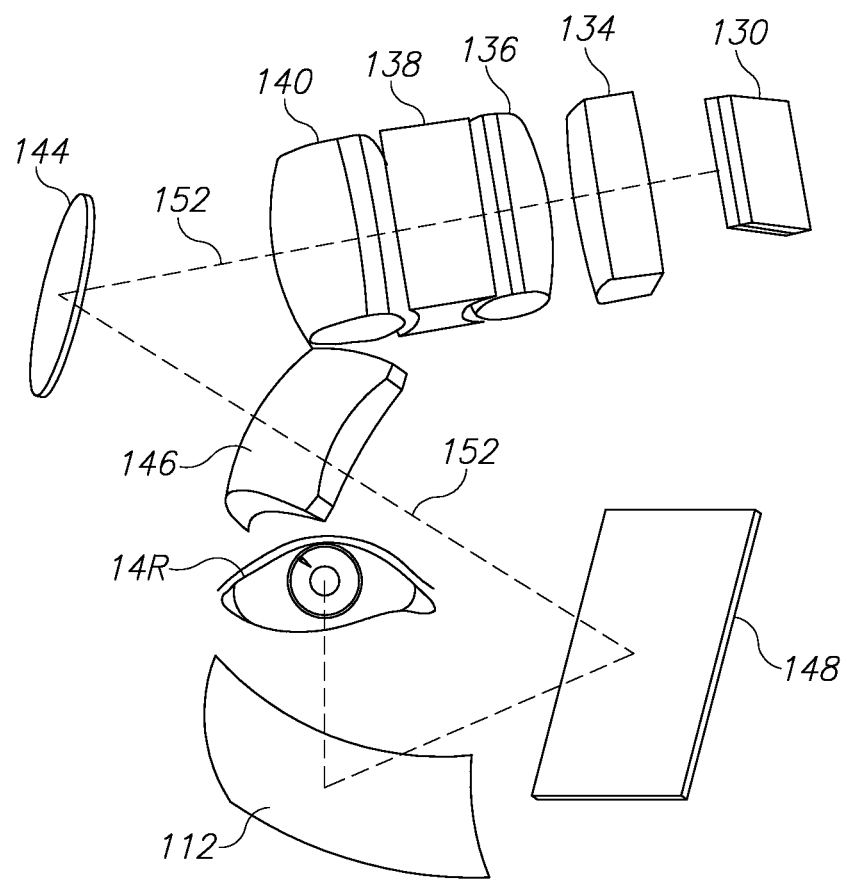
Figure 1C:
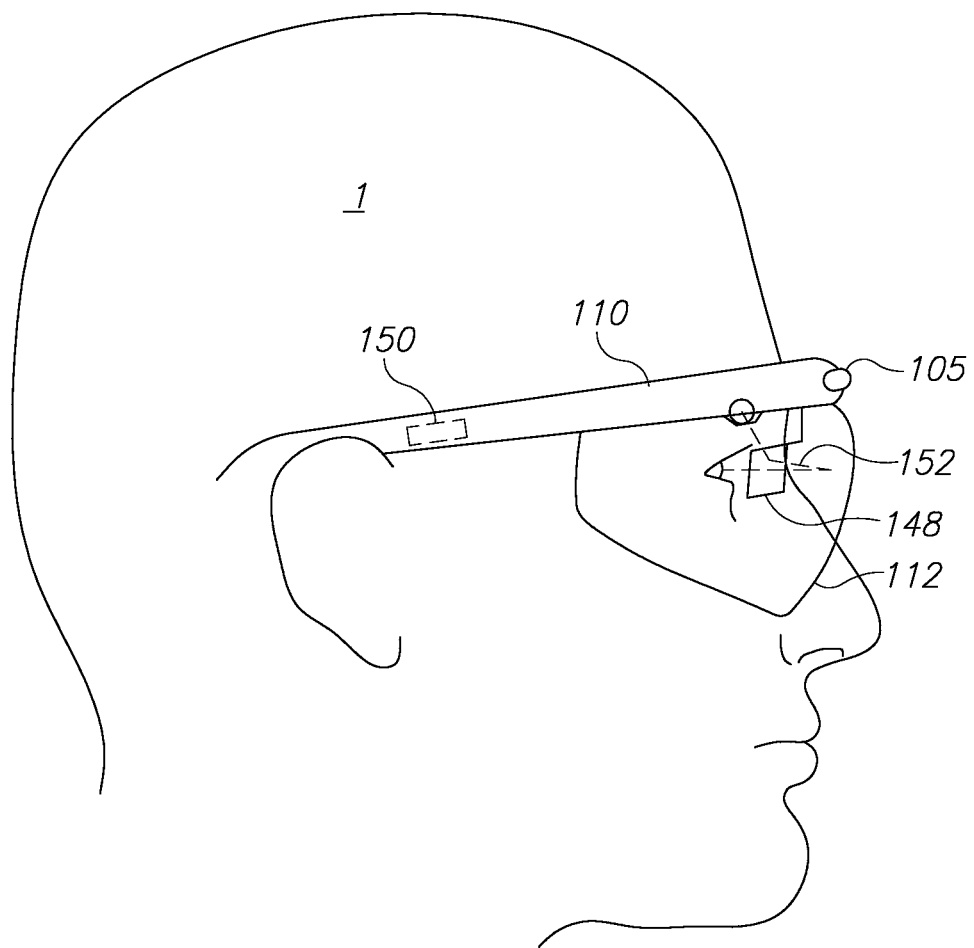

Reference is now made to FIGS. 1A, 1B and 1C which illustrate a HMD 100 according to some embodiments of the invention. Brief details are provided herein for the purpose of explanation. An HMD suitable for use in some embodiments of the invention is disclosed in international patent application WO2016/135727 A1. The HMD of FIGS. 1A, 1B and 1C is described in more detail in international patent application WO 2017/179054A1. FIG. 1A is front view of a HMD 100 according to some embodiments of the invention mounted on the head of a user 1. FIG. 1B is a schematic illustration showing a detailed view of the optical display system shown in FIG. 1A. FIG. 1C is a side view of the HMD mounted on the head of a user 1. The HMD of FIGS. 1A-1C is in the form of wearable eyewear (e.g., glasses, spectacles, frame, etc.), including user attachment section 110 and partially transmissive partially reflective optical part 112. User attachment section 110 includes a nosepiece 126 configured to support an optical display system securely on the nose of user 1 (optionally via a nosepiece adapter—not shown). User attachment section may include a touch or tap sensitive portion 255 for user input or the headset may include some other user input device.

The HMD includes an image generator 130, lenses 134, 136, 138, 140, and 146, and reflectors, e.g. mirrors, 144 and 148 forming an optical arrangement. A framework (not shown) is configured and operative to precisely position the various optical components in precise relative positions and orientations with respect to each other. Altogether these components may form an optical display system 210 that is operative to project imagery (e.g., images, video, graphical representations, etc.) onto partially transmissive partially reflective optical part 112 that is superimposed or overlaid over the center of the user's field of view (FOV), while keeping the user's field of regard (FOR) intact without the introduction of obstructions (e.g., non optical structural elements), or distortions.

The HMD 100 further comprises an image capturing device such as a camera 105, eye tracking sensors 122, and electronic control unit 150 described in more detail with reference to FIG. 2.

Mirror 148 is shown positioned near to the nose of the user 1. In other HMDs a different mirror arrangement may be used with reflectors in other arrangements away from the user's nose.

Partially transmissive partially reflective optical part 112 may be operative to be partially transmissive to light incident on its outer facing surface, and concurrently be partially reflective to light incident on its inner, user facing surface. Partially transmissive partially reflective optical part 112 may have a surface that follows the curvature of an ellipsoid that has at least to two foci, such that at least one focus is configured coincide with a position of an eye (i.e., the pupil) of the user.

Figure 2:
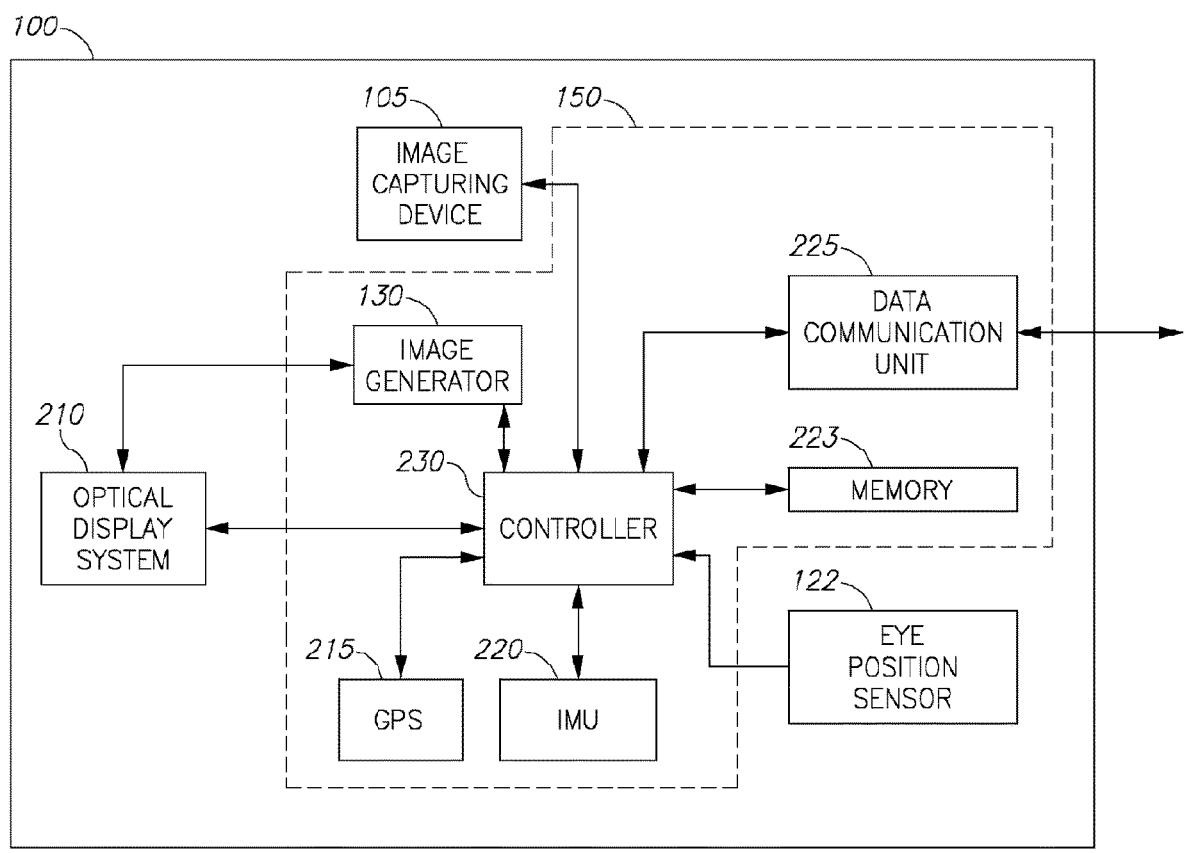
FIG. 2 is a schematic diagram showing components that may be comprised in the HMD of FIG. 2 according to some embodiments of the invention.

FIG. 2 is a block diagram of components that may be comprised in a HMD 100 according to some embodiments of the invention. The components of a HMD 100 according to some embodiments of the invention may be the same as in headsets known in the art, configured to operate according to embodiments of the invention. Thus, some embodiments of the invention provide a computer readable medium, transitory or non-transitory, comprising instructions which, when implemented in a processor in a data communication unit of a headset cause the processor to implement methods according to some embodiments of the invention.

It should also be noted that it is not a requirement for embodiments of the invention, unless otherwise stated herein, for the components shown in FIG. 2 to be part of a HMD. In some embodiments of the invention the components may be distributed about the user in various ways as appropriate to the function of the component for example but not limited to in pockets, in peripheral devices such as mobile phones, attached to or embedded in clothing, attached to or embedded in parts of the body other than the head. Thus, the components shown in FIG. 2 are generally referred to as "user equipment" and the term "user equipment" may refer to one or more components, for example as shown in FIG. 2, carried by, embedded in, worn by or attached to a user.

According to some embodiments of the invention, a user may be provided with only a selection of components of user equipment or a selection of components of a HMD as described herein. Thus for example HMDs used in some embodiments of the invention may include only the minimum components required to perform a particular function, for example to conserve space and thereby enable a more comfortable or stylish design.

In FIG. 2, a HMD 100 may comprise at least one image capturing device 105, or image sensor, such as a CCD array, capable of capturing still or video images. Image capturing device may have a wide FOV, for example it may be a 360° camera array or other wide FOV image capturing device, or it may have a narrower FOV. The HMD 100 may further comprise an image generator 130, optical display system 210 which may be a wide FOV display, a global positioning system "GPS" unit or other position sensor 215, an inertial measurement unit "IMU" or orientation sensor 220 which may for example output LOS measurements as described further herein, eye tracking sensors 122 which may for example output eye position measurements to determine a user's focus depth, or attention range as described further herein, user input device 255, memory 223, a data communication unit 225 and a controller 230. Controller 230 may be, for example, a central processing unit processor (CPU), a chip or any suitable computing or computational device The data communication unit 225 may transmit data received from any one or more of the image capturing device 105, the GPS unit 215, and the IMU 220. Controller 230 may perform one or more operations on the data prior to transmission from the data communication unit including but not limited to any of processing, analyzing and filtering.

Eye tracking sensors are known in the art and any suitable eye tracking sensor, or pair of sensors, may be used in some embodiments of the invention. Some examples of systems for eye tracking are shown in U.S. Pat. No. 7,401,920 B1 and International Patent Application WO2016045784 (A1). Systems of this type may be used in some embodiments of the invention. Other suitable systems may be used and will be familiar to those skilled in the art.

Some or all of the components shown in FIG. 2 may be comprised in an electronic control unit 150 which may be mounted on or housed in the user attachment section 110 of a HMD. In the embodiment of FIG. 2, only some components are shown to be comprised in an electronic control unit 150.

In all embodiments of the invention unless otherwise stated the image capturing device may include a collection of individual image capturing devices arranged around a user's body, for example around or on top of his head, optionally as part of a HMD, on the shoulder of the user or at any other location.

Systems and methods according to some embodiments of the invention may be considered to operate in two modes, one of which involves the collection of data for use in the selection of a site and the other of which involves the selection of a site for display to a user or group of users. Some embodiments of the invention may comprise only the collection of such data and some embodiments of the invention may comprise only the selection of a site, for example based on previously collected data.

The collected of data according to some embodiments of the invention may be analyzed to identify new sites which had not been recognized to be likely to be viewed by users. Thus according to some embodiments of the invention, in addition to or alternatively to the viewing of known or predetermined sites, data from headsets may be analyzed to identify any locations at which users look, for example for more than a predetermined time.

Figure 3:
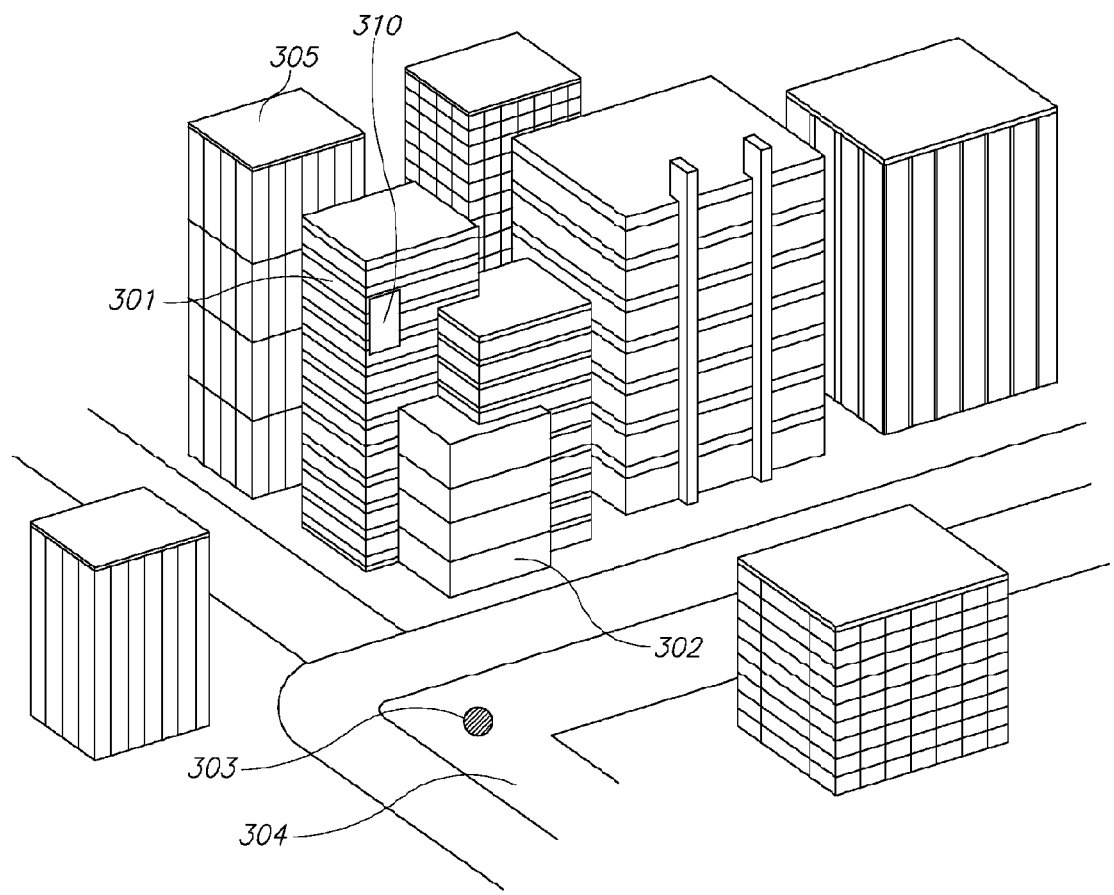
FIG. 3 shows a city scene showing a site and a possible viewing position of a user according to some embodiments of the invention.

FIG. 3 shows a city scene including streets, one of which is numbered 304, and buildings some of which are numbered 310, 302, 305, as an example of a geographical area in which information might be communicated to users. For example, the sides of the buildings may be suitable sites for displaying information. One possible site 310 on the side of building 301 is indicated. Site 310 is visible from position 303 on street 304. If a user at position 303 is wearing a headset, then data may be transmitted from the headset, for example to a server or other remote device, and analyzed to infer whether the user looked at the site. Alternatively this analysis may be performed by a processor in the headset. The data may include position, determined for example by a GPS unit 215; orientation, determined for example by IMU 220 and optionally gaze direction data determined for example by eye tracking sensors 122. The position may be in earth co-ordinates, for example determined using GPS data. Data from headsets worn by a plurality of users may be received and analyzed. As described in more detail herein, according to embodiments of the invention it is possible to determine a probability of the site being viewed by users, for example located at the street level. The probability may be used for example to select one site from a plurality of available sites. It will be appreciated that the determined probability may be an estimate of the actual probability, based for example on data from a statistical sample of headset wearers at the street level.

According to some embodiments of the invention, one or more operations may be performed on data collected at a headset 1, for example by a controller 230, before it is transmitted, for example by a data communication unit 225. Alternatively such operations may be performed at a remote device or computing system to which the data is transmitted, such as a server. One such operation may comprise the analysis of data collected at the headset to determine whether it is suitable for use in determining the probability of a site being viewed. This may for example include quality analysis. For example, if data collected at a headset indicates that a site was viewed by a user for more than 30 seconds, the quality of this data may depend on what sensing data was used to derive the indication and the accuracy of the sensing data.

The probability of a site being viewed may vary from one group of users to another. Thus according to some embodiments of the invention, the selection of a site is based on one or more user characteristics. For example, a method according to the invention may include receiving or retrieving one or more user characteristics describing the user of a headset from which data is received. The data may be stored with received user characteristics so that it is then possible to select a site based on one or more user characteristics. For example it is possible to determine a probability of a site being viewed by users with one or more particular characteristics.

Data received from a headset may not on its own be sufficient to determine whether a user is looking at a particular site. For example, GPS position data may only provide three-dimensional position data but may provide no indication as to what a user can see. A user may for example look in the direction of building 305 but not be able to see it because it is blocked by building 301. Therefore, according to some embodiments of the invention an additional source of information may be used to infer whether a user looked at a particular site. For example, a 3D model of the scene, if available, may be used as an additional source to determine which sites are actually visible from which positions and thus some embodiments of the invention may comprise querying a 3D model of the geographical area, for example from a 3D map database, to determine whether a user of a headset viewed a site.

In another possible scenario, a user may look in the direction of a remote building but focus on something which is in front of it but does not necessarily block it. Therefore, additionally or alternatively to the use of 3D model data, eye convergence data, eye tracking information or other data indicating what the user was looking at, for example from eye tracking sensors 122 in headset 100 as shown in FIG. 1, may be used to determine focus depth or attention range and thereby infer what the user has focused on, and therefore whether the user has actually seen a site. The measurement of eye convergence is known in the art, for example from patent publication WO2016045784 (A1).

It is important to note that the orientation of a user's head, as determined for example by an IMU, may not be indicative of what the user is looking at although for some purposes it may be adequate. It is possible to use measurements of eye position, for example from eye tracking sensors 122, to determine the direction of a user's gaze. The gaze direction may be different from the user's head orientation as determined for example by IMU 220, and the gaze direction may be more indicative of what the user sees, or pays attention to. For example the user's head may be pointing in one direction but the user may move his or her eyes to gaze in a large range of different directions. The difference between the head orientation and the direction of gaze is termed "binocular divergence". According to some embodiments of the invention, this divergence may be analyzed by tracking the gaze direction of the eyes with respect to the head direction or orientation. By performing this analysis as well as analyzing objects, including sites as described herein, along the user's line of sight or gaze, it is possible to estimate whether a user is looking at a site. Furthermore measurements of individual eye positions determined by an eye tracking sensor may be used to estimate the distance at which the user's eyes are focused and thereby estimate an "attention range" described further herein, The attention range can be considered to be a depth of field slice defined by two different radii centered on the user. Thus the "attention depth" may define an annular space surrounding the user.

As used herein, unless otherwise indicated, LOS refers to the orientation of the user's head as determined for example by an IMU.

According to some embodiments of the invention the direction in which a user is looking, or paying attention, may be determined from one or both of LOS and direction of gaze, for example depending on the required level of accuracy.

Figure 12:
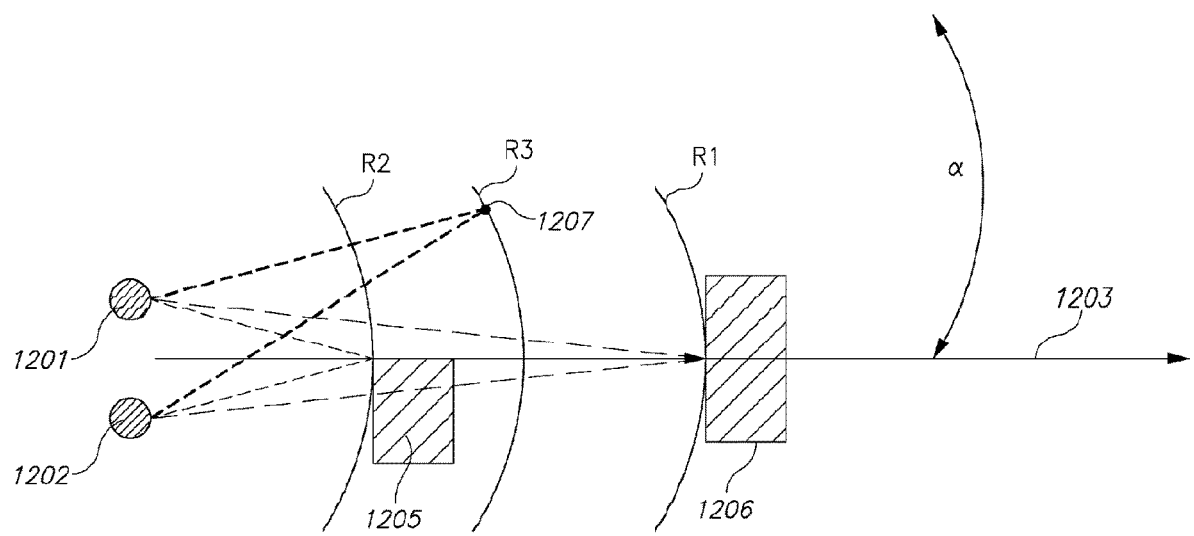
FIG. 12 is a schematic diagram illustrating the determination of gaze direction and attention range according to some embodiments of the invention.

The principles of determining gaze direction and attention range are described herein with reference to FIG. 12.

For either real or virtual communication of information via a site, the area of the site may be aligned with a feature in the scene, for example a site may be aligned with windows or wall spaces in building 301.

According to some embodiments of the invention, the analysis of headset data may comprise determining a measure of the popularity of each site. Various parameters may be used in this determination. For example, the determination of popularity may include determining the number of users who look at a site for longer than a predetermined time by analyzing received headset position and orientation and/or eye gaze direction data. This analysis may be used to determine a frequency of users who look at a site for more than a predetermined time, or "hit rate", for a site. The predetermined time may be continuous or not. In some embodiments only one hit, e.g. look for more than a predetermined time, per person in a predetermined time period, e.g. day, may be counted as part of the popularity determination. Thus it is possible according to embodiments of the invention to generate a map of an area showing the relative popularity of different points in a scene. This might take the form of a kind of "heat map", for example similar to an infrared image, with the sites most popular or most attractive to users being shown to be "hotter". According to some embodiments such a map may depend on one or more user characteristics. For example different maps may be generated for different characteristics. A map of the kind described herein may be presented on a visible display to demonstrate the results of analysis of headset data, for example to demonstrate the effectiveness of communication of information to users via particular sites.

Figure 4:
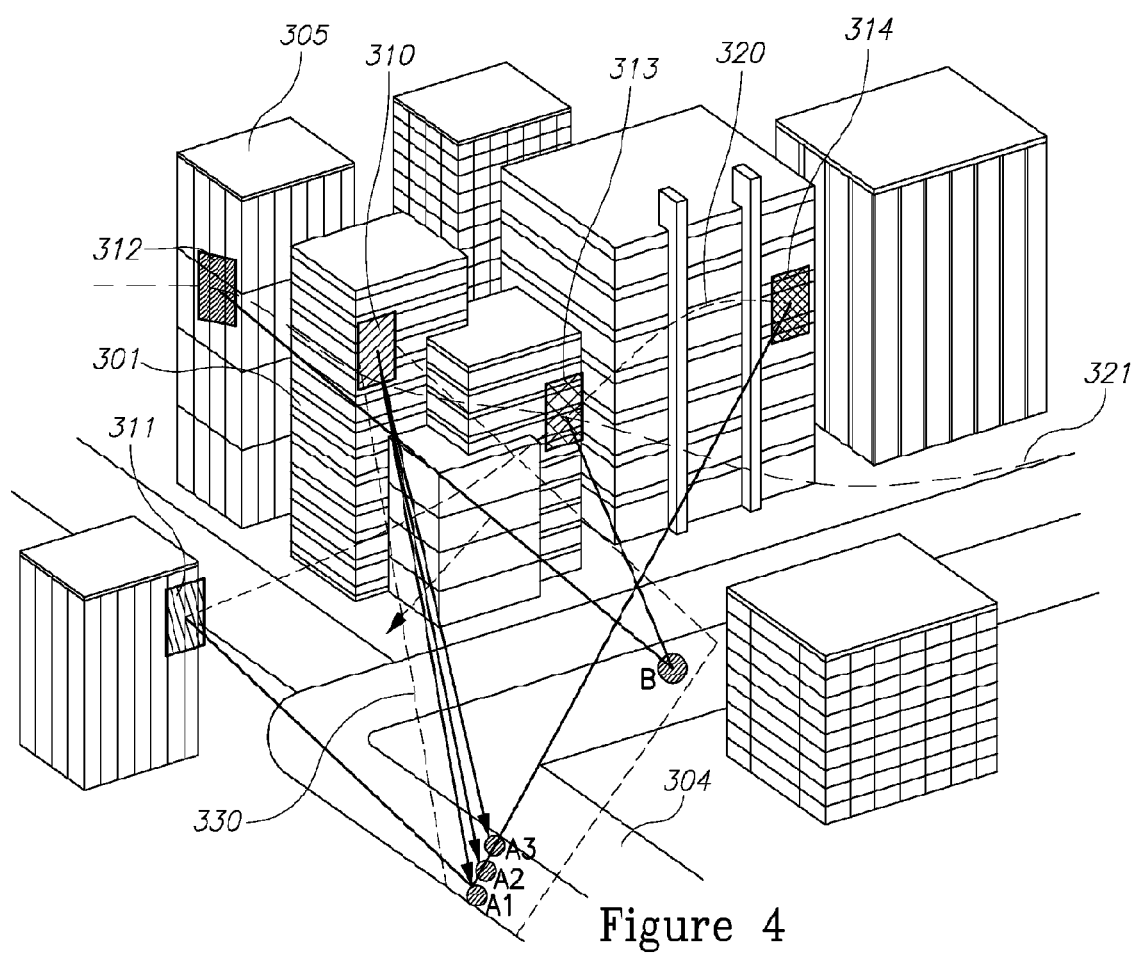
FIG. 4 shows the city scene of FIG. 3 indicating multiple sites and paths followed by users according to some embodiments of the invention.

FIG. 4 shows the same city scene as shown in FIG. 3 with possible positions and viewing directions of two users. Numerals 310-314 denote sites at which information may be communicated, e.g. displayed, to a user. According to some embodiments of the invention, the path of a user's gaze or LOS or both may be tracked and analyzed. FIG. 4 shows positions A1, A2, A3 of a user walking along the street 304. Dotted line 320 indicates the path of the user's gaze or LOS. Position B is a stationary position of a second user, which may be for example at a pedestrian crossing, and dotted line 321 indicates the path of this user's gaze. The intersection of paths 320 and 321 at site 310 suggests that the probability of site 310 being viewed is higher than that of the other sites shown in FIG. 4.

The paths, or trails, of the gaze and/or LOS of users may be associated with time and geo-location data. The trails may be projected onto three-dimensional scene data in the manner shown in FIG. 4. Intersections of gaze and/or LOS trails and/or pauses in such trails may be accumulated to provide a viewing profile of a site.

Some embodiments of the invention may comprise determining one or more parameters or characteristics of sites, or positions from which sites may be viewed referred to herein a viewing positions, or both, for example based on analysis of data from headsets and optionally one or more other sources. The parameters may include viewing probability and others as described herein. The parameters may be stored in a database or other data structure which may be queried for a selection of a site, for example according to one or more filtering criteria, as is known in the art of data structures. A database or other data structure may be updated based on real time data received from headsets. Selection of a site may be based entirely on real time or recent information or pre-stored information, or a combination of these. The ability to base decision on near real time information is particularly useful for example in responding to emergency situations in which recorded patterns of user behavior may not be representative of current user behavior, or in any other situation in which user behavior departs from an established pattern more quickly than normally expected, any of which can be identified by statistical analysis. Some embodiments of the invention may comprise detecting from analysis of headset data a sudden change in user viewing behavior, for example a rate of change of hit rate of more than a predetermined threshold and displaying information to one or more users at a selected site in response to this change.

Viewing probabilities determined according to some embodiments of the invention may be stored in a database for future use or may be determined using data previously stored in a database.

According to some embodiments of the invention, a rate of change of orientation threshold may be used in determining the popularity of a site or a preference for one site over another. This may be in addition to or alternative to the use of a predetermined time. The significance of this is illustrated in FIG. 4. If a user at position B moves his head very quickly from site 312 to site 313 he may not glance at either for a sufficiently long time to pay any attention to them.

Among parameters or characteristics that may be determined or stored for sites is the area or volume from which the site is visible. FIG. 4 shows a volume 330 in the form of a beam emanating from site 310 enclosing positions from which site 310 is visible. This may be used in the selection of a site at which to display information. The volume may be determined from data received from headsets, from other sources such as a 3D dimensional model of the area, or both.

According to some embodiments of the invention, a site may be selected for the communication, or display, of information to a user, for example based on the position and optionally orientation and/or gaze direction of the user, or the predicted position and optionally orientation and/or gaze direction of the user at the time the information is communicated. Received data from a headset may be analyzed to perform such prediction. The selection may be based on an analysis of data received from headsets to determine the probability of a site being viewed by users. For example site 310 may be selected from sites 310-314 if it has the highest probability.

According to some embodiments of the invention, the selection of a site may be performed in response to a request, and the request may identify a position, e.g. current or predicted position of a user, and possibly also orientation.

Figure 5:
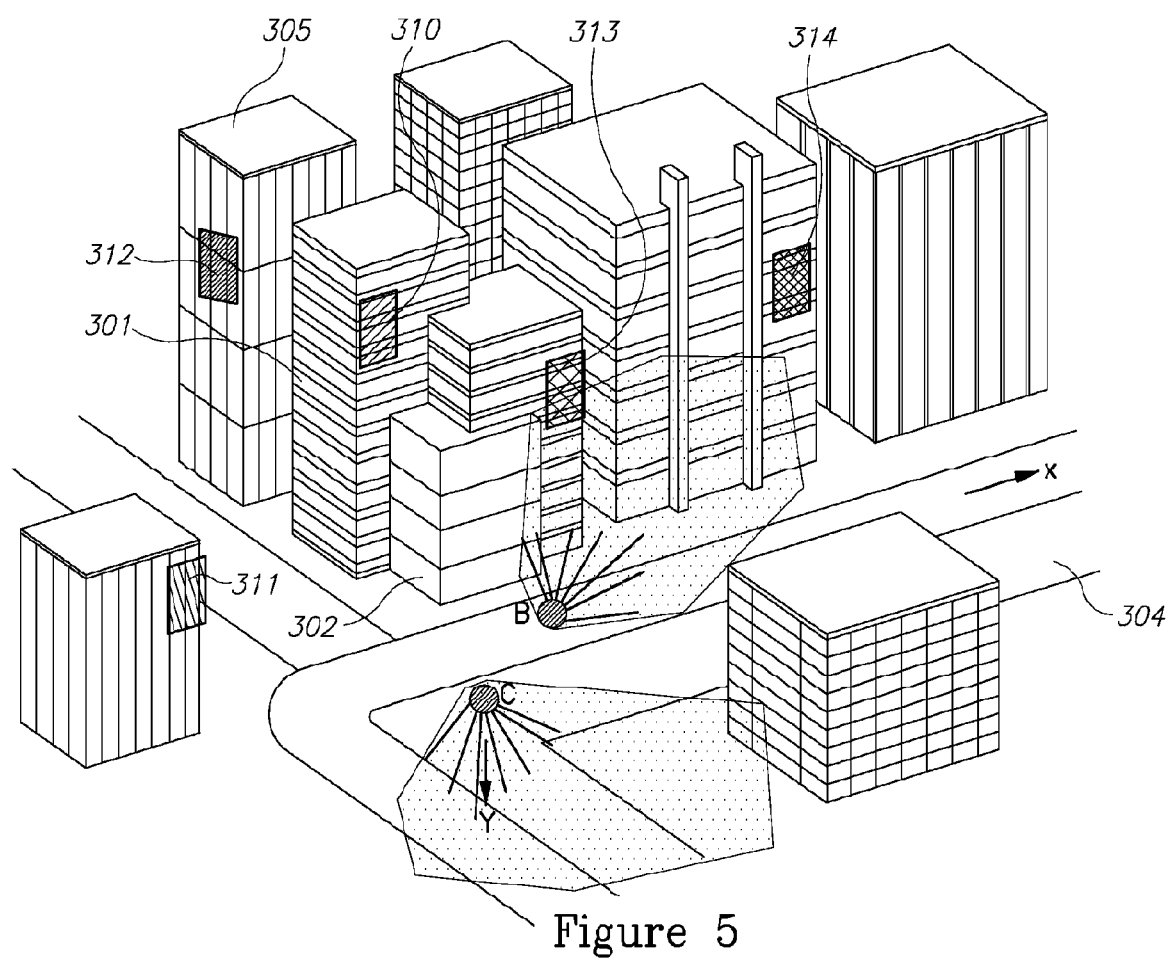
FIG. 5 shows the city scene of FIG. 3 indicating sites potentially visible to users from different positions according to some embodiments of the invention.

FIG. 5 shows the same city scene as FIG. 4 indicating how the direction of travel or LOS or gaze of a user may affect the probability of a user viewing a site. According to some embodiments of the invention, the selection of a site may be filtered based on the orientation of a user. The filtering may be done before a site is chosen based on viewing probability. For example, referring to FIG. 5, a user at position B oriented in direction X is not likely to see all of the sites shown in FIG. 4. Sites 310, 311 and 312 may be filtered from the selection so that the selection is made between sites 313 and 314. Similarly all of the sites shown in FIG. 4 may be ruled out for selection for a user at position C oriented in direction Y.

According to some embodiments of the invention, the probability of a site being viewed by users in a geographical area may be determined at least partially based on the popularity of one or more positions from which it may be viewed. Thus in methods and systems according to some embodiments of the invention, one or more viewing positions are identified from which one or more sites is visible. Each identified viewing position may be further qualified by a particular orientation. A combination of position and orientation is known in the art as a "pose". Each identified pose is a potential viewing pose or "PVP" of a user in the geographical area. A pose may additionally be qualified by gaze direction according to some embodiments of the invention but this is not essential.

A viewing position may be identified in one or more ways according to some embodiments of the invention. For example it is possible to analyse received headset data to detect each time a user looks at one of the sites 310-314 that is longer than a predetermined duration, determine a position corresponding to each detected instance of looking and identify each determined position as a viewing position. Additionally or alternatively, identifying a viewing position may comprise identifying one or more positions frequented by said plurality of users, determining whether a site is visible from each identified frequented position, and identifying each frequented position from which a site is determined to be visible as a viewing position. A frequented position may be defined as a position visited by more than a predetermined number of users, optionally further limited to visits of more than a predetermined duration and/or within a predetermined time period. Additionally or alternatively, identifying one or more positions frequented by said plurality of users may comprise tracking paths travelled by users, identifying path intersections in a similar way to identifying gaze and/or LOS trail intersections described with reference to FIG. 4, and identifying one or more intersections as a position frequented by said plurality of users.

The popularity of a viewing position may be determined in an analogous manner to the popularity of a site as discussed herein. For example, the popularity of a viewing position may be determined in terms of number of users who stand at a position for longer than a predetermined time, which might be used to determine a frequency or "hit rate" for a viewing position. An example of a popular viewing position might be a pedestrian crossing. The measured popularity of a viewing position may take into account orientation and gaze direction data received from a headset. This may for example filter out users who look intently at the "walk" sign at a crossing without looking around.

According to some embodiments of the invention a multi-level database may be compiled and used in the selection of a site, including but not limited to one or more of data relating to sites, data relating to viewing positions or PVPs and more described herein.

As with viewing hit rate, a change in viewing position hit rate above a predetermined threshold may be detected and in response information may be displayed to users at a selected site.

In a similar manner to the determination of a viewing volume 330 for a site as shown in FIG. 4, it is possible according to some embodiments of the invention to determine a similar "visible volume" originating at a viewing position or PVP which may contain sites that are visible from a viewing position or PVP.

Figure 6:
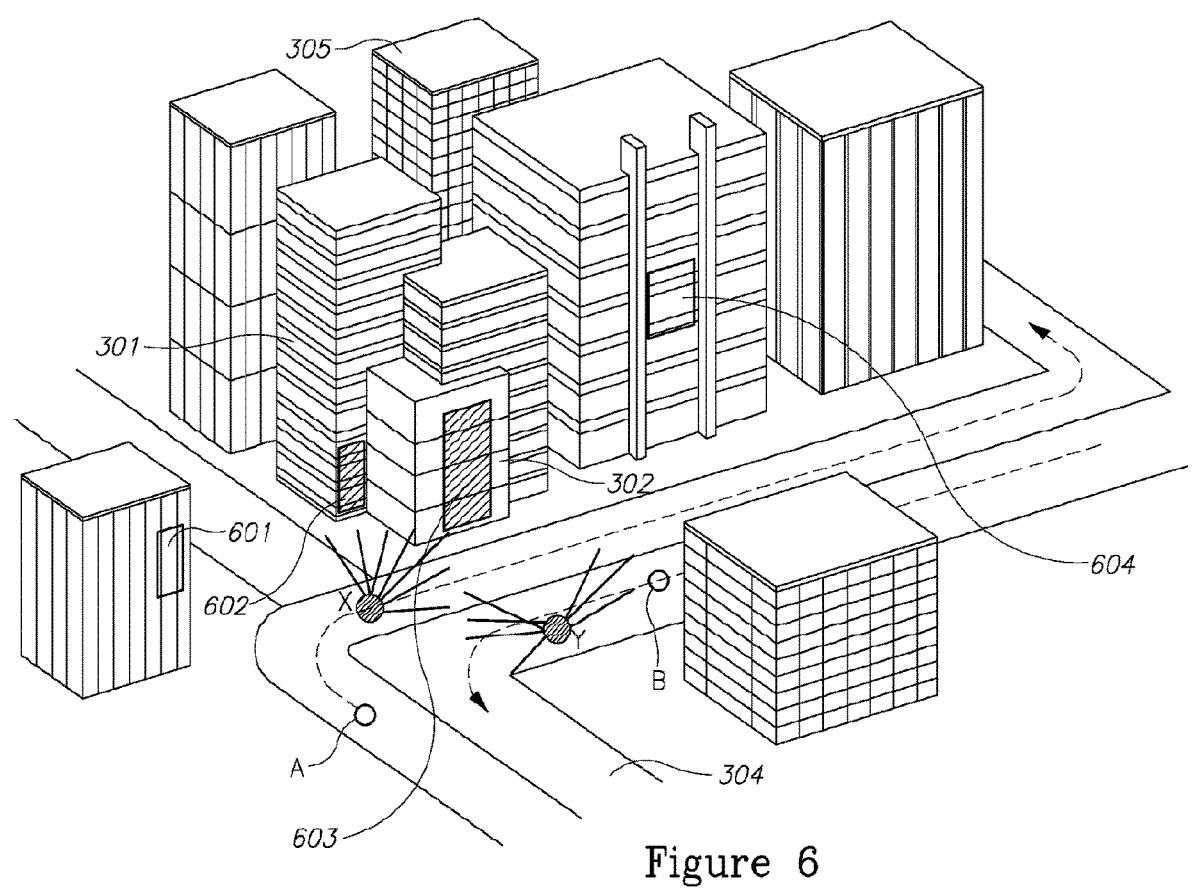
FIG. 6 shows the city scene of FIG. 3 illustrating the possibility of grading sites according to their popularity according to some embodiments of the invention.

FIG. 6 shows how the popularity of different sites in a scene may be used in the selection of a site for communication of information to a user. FIG. 6 shows four sites 601-604 having different levels of popularity. This may be determined according to a time of day. For example suppose that site 603 was viewed more than 100 times in the period 10:00-10:30 am and site 604 was viewed less than 5 times in the same time period. FIG. 6 shows two paths indicated in dotted lines passing from left to right taken by user A and right to left taken by user B respectively. User A passes position X where the popular viewing directions are indicated. Here any of sites 610-603 may be chosen but site 603 may be chosen in preference for communication to user A because of its higher popularity. User B passes position Y and site 603 may also be chosen for communication to user B.

According to some embodiments of the invention a site may be chosen according the characteristics of the user. For example if user B is a child, the relative popularities of sites may be different from those for an adult. Therefore the choice of site may be different for users A and B because of their different characteristics.

Figure 7:
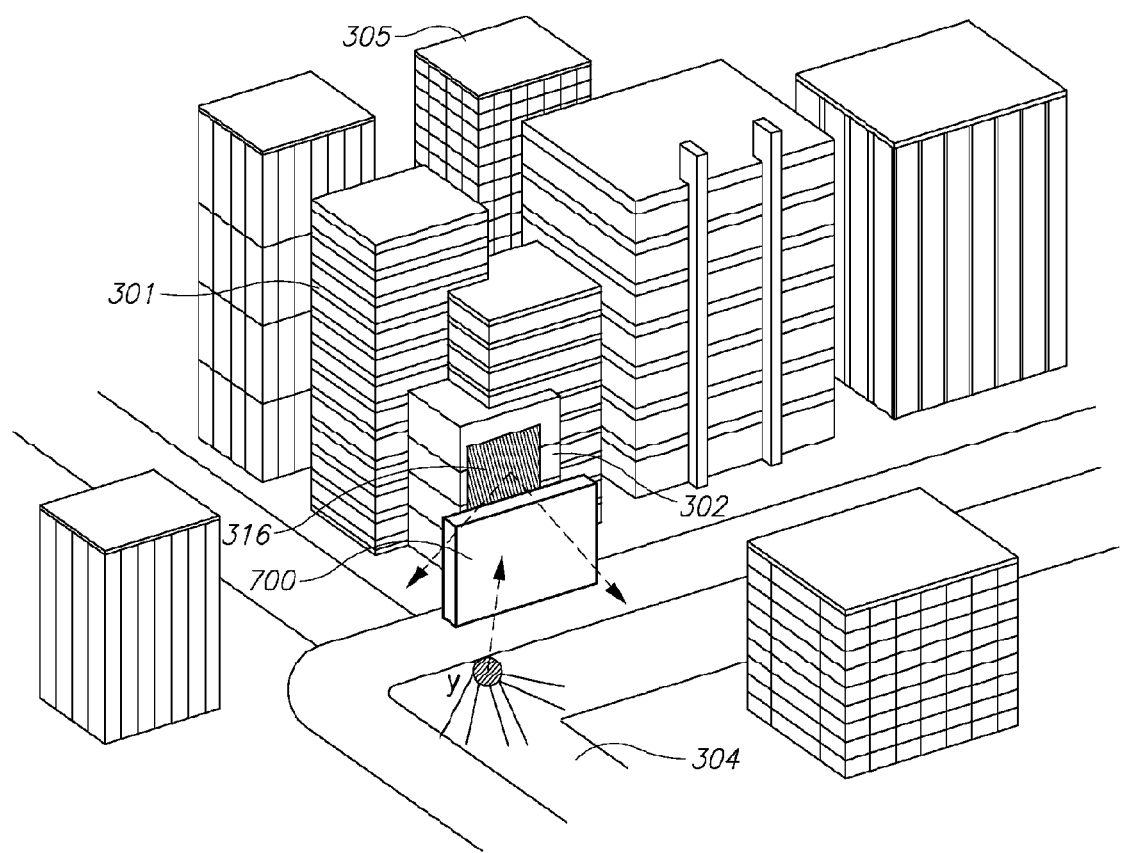
FIG. 7 shows the city scene of FIG. 3 showing the possibility to account for line of sight "LOS" blockages according to some embodiments of the invention.

FIG. 7 shows how a site 316 may be blocked either temporarily or permanently by an obstacle 700. According to some embodiments of the invention, data received from a headset may be analysed and used to infer the blockage of a site from one or more PVPs. For example data from eye movement tracking may determine that site 316 is not or is no longer looked at from certain PVPs and from this it may be inferred that it is blocked. The presence of a blockage or obstacle may be recorded as data describing the site, the PVP or both.

It will be appreciated that data received from user headsets may be compiled and presented in various ways. For example it may be presented in the form of a 3D map showing any of the parameters discussed above such as viewing volumes, visibility volumes, grades of sites or PVPs and any of the above being filtered by any user profile parameter. It is possible according to some embodiments of the invention to represent sites or PVPs according to their popularity. For example a representation of sites may use different colours to represent their relative popularity. This is indicated in FIG. 4 where different shading is used for different sites. Thus some embodiments of the invention may comprise scoring possible viewing areas or PVPs according to a probability that a site will be viewed from that area.

In addition to using received data relating to a site and/or a viewing position, various kinds of additional data may be used in any combination in the selection of a site. These include but are not limited to user parameters or characteristics, temporal parameters and meteorological data.

According to some embodiments of the invention user parameters or characteristics may be taken into account when selecting a site via which to communicate with a user, e.g. at which to display information to a user. For example, the viewing behaviour of a child may be different from that of an adult. A child may be more likely to view low level sites such as shop windows and less interested in architecture and therefore less likely to view the tops of buildings. In methods and systems according to some embodiments of the invention, data received from headsets may include user characteristics or parameters, or a user identity which may be used to look up user characteristics or parameters. Thus for example a LOS track such as track 320 or 321 shown in FIG. 4 may be associated with a user of a particular age. According to some embodiments of the invention a determination of viewing probability may be specific to users having certain characteristics. For example, viewing probability for users having a particular characteristic may be determined using only data received from headsets worn by users with that characteristic.

According to some embodiments of the invention, temporal parameters may be taken into account when selecting a site via which to communicate with, e.g. display information to, a user. For example, in some systems and methods according to embodiments of the invention received data relevant to a site or a viewing position or both may be associated with a time of day or year. Then it is possible to determine a probability of a site being viewed according to the time of day or year. This may be useful in various ways. For example a highly reflective surface may not be looked at during certain times of day because the user is "blinded" by strong sunlight, the tops of buildings may be less noticeable at night, a site may blocked by a deciduous tree be more visible in winter and so on. Therefore a site may be selected according to the time of day or year.

According to some embodiments of the invention, parameters relating to ambient conditions, such as meteorological data, may be taken into account when selecting a site. This also may be used for example to avoid selection of a reflective site during strong sunshine.

Table 1 below shows examples of some data that may be recorded in a multi-layer database or other data structure according to some embodiments of the invention relating to sites, possible viewing positions, and users. The table shows examples of parameters that may be stored and is not intended to be limiting. For each of site, viewing position and user, some or all of the parameters may be omitted and others may be stored. A database according to embodiments of the invention may be used to determine e.g. viewing probability. Thus for example the database may be queried and from this viewing probability may be determined. Alternatively a database according to some embodiments of the invention may store previously calculated determinations of probability of a site being viewed.

TABLE 1

| Site | Viewing Position | User |
| --- | --- | --- |
| Popularity (from LOS data) | Popularity | Height |
| Popularity (from gaze direction data, optional extra layer of database information) | | |
| Popularity (from attention range data, optional extra layer of information) | | |
| PVPs from which visible | Sites visible | Age |
| Volume/area from where site is visible | | Gender |
| Hit rate | Hit rate | |
| Time preference | | |
| Audience (users' preference) | | |

A data structure according to some embodiments of the invention may be queried in any way, for example in order to select a site via which to communicate information to a user. For example, available sites may be filtered according to site parameters, viewing position and user parameters in any order.

Figure 8:
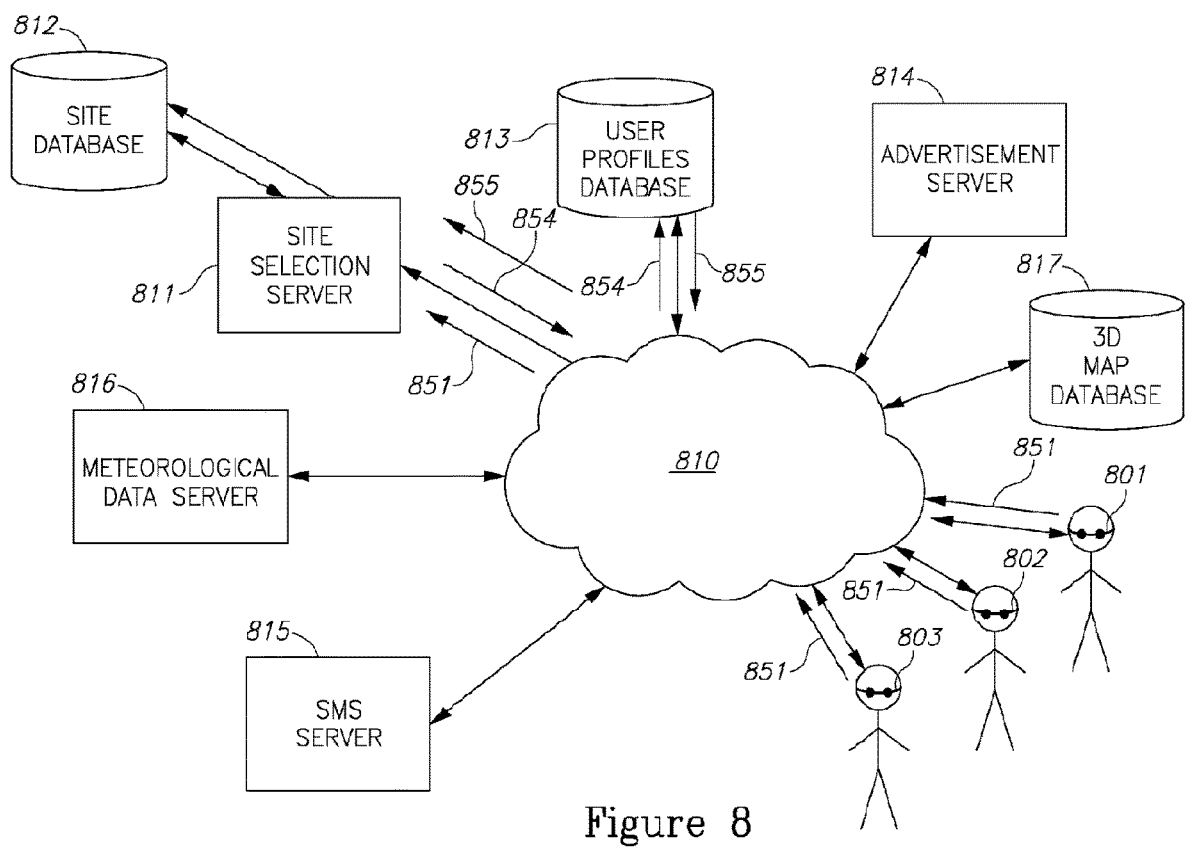
FIG. 8 is a block diagram of a communication system including servers according to some embodiments of the invention.

FIG. 8 shows a communication system according to some embodiments of the invention.

The system of FIG. 8 includes a plurality of headsets worn by respective users. Three headsets 801, 802, 803 are shown in FIG. 8. Any number of headsets may be included in a system according to some embodiments of the invention. The headsets 801-803 are able to communicate via a communication network 810 with any of a site selection server 811 having an associated site database 812, a user profiles database 813, an advertisement server 814, an SMS server, a meteorological data server 816, and a 3D map database 817. Any of the servers illustrated in FIG. 8 may have an associated database, not shown, and any of the databases may be associated with a server, not shown. The functions of any of the databases and servers shown in FIG. 8 may be combined so that, for example, one server may fulfil the functions of two or more servers shown in FIG. 8. Similarly the functions of any of the servers or databases shown in FIG. 8 may be distributed across multiple devices. Any of the servers shown in FIG. 8 may comprise a computing system as described with reference to FIG. 11. Methods according to some embodiments of the invention may be implemented in a server such as site selection server. Thus in some embodiments the invention provides a server configured to implement any of the methods described herein.

The communication network 810 may comprise any communication network know to those skilled in the art including wired and/or wireless connections using any communication protocol including but not limited to one or more of internet protocol, GRPS and GMS.

Figure 9:
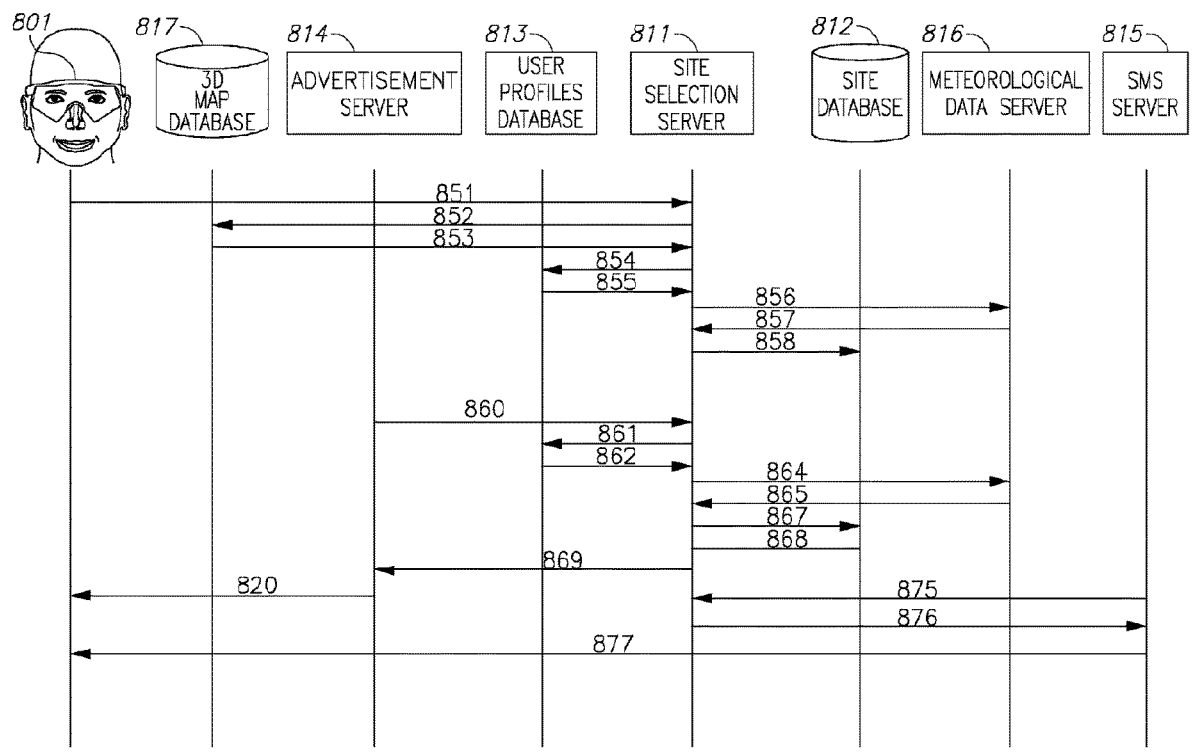
FIG. 9 shows some possible messaging flows in the communication system of FIG. 8.

A site selection server 811 as shown in FIG. 8 may receive position, orientation and gaze direction data from any user headset 801, 802, 803 as indicated by arrows 851 in FIGS. 8 and 9. In FIG. 9 only one user headset 801 is shown for the sake of clarity. Some messaging flows which may occur in the system of FIG. 8 are shown in FIG. 9 only for the sake of clarity.

At the site selection server 811 the data from headsets 801, 802, 803 may be analyzed, for example in order to determine for each of a plurality of sites, e.g. sites 310-314, a probability of the site being viewed by users in a particular geographical area. The geographical area may be derived from the position data. The site selection server may retrieve data from another data source in order to determine whether a particular site was viewed. FIG. 9 shows a request 852 for 3D map data from 3D map database 817 and response 853 with 3D map data for use in analysis at site selection server 811.

According to some embodiments of the invention, the data received from headsets 801, 802, 803 may include user profile information. According to other embodiments of the invention, the data received may include an identity of the user which may be used to consult a user profile database for user characteristics. Thus according to some embodiments of the invention user characteristics are received or retrieved. Retrieval may comprise requesting information from user profiles database 813 by site selection server 811 as indicated by arrows 854 in FIGS. 8 and 9, and receiving information from user profiles database 813 as indicated by arrows 855.

According to some embodiments of the invention, data received from headsets 801, 802, 803 may include information relating to ambient conditions such as the prevailing weather. Additionally or alternatively, data relating to ambient conditions may be retrieved from a database, for example in response to receiving position, orientation and/or eye gaze direction data from a headset. For example, a site selection server may query a meteorological data server 856 for data relating to the weather at the time the headset data was obtained, as indicated by arrow 856, and receive the requested data as indicated by arrow 857.

Data received from headsets, and optionally the results of analysis performed at the site selection server 811 such as determined probabilities, may be stored at site database 812 as indicated by arrow 858.

According to some embodiments of the invention, a server, such as site selection server 811, may receive a request for a selection of a site at which to display information to a user or a group of users, for example a user or users wearing a headset. Such a request may be received for example from an advertising server such as advertisement server 814, from SMS server 815 or from any server that serves information to users. FIG. 9 shows request 860 from advertisement server 814 by way of example.

A request 860 may include the position or expected position of each user or may define an area in which a group of users is present or expected to be present. This position information may be provided by the requesting server, e.g. advertisement server 814. Alternatively some embodiments of the invention may comprise maintaining current information on position or expected position of users from whom position data is received and responding to a request for a selection of a site with the site selection as well as information identifying one or more users to whom information may be displayed at the site.

A request 860 may include profile information such as characteristics relating to one or more users to whom information is to be displayed. Alternatively a request may identify one or more users whereby a site selection server 811 may receive or retrieve information from user profiles database to determine one or more characteristics of one or more users to whom information is to be displayed, as indicated by arrows 861, 862, whereby to select a site according to user characteristics, such as but not limited to age, gender, profession, interests, preferred entertainment such as music or art, hobbies, etc.

A request 860 may include information relating to ambient conditions at a position or area indicated in the request. Alternatively a site selection server 811 may retrieve or receive information from a database storing details of ambient conditions such as a database associated with meteorological data server 816, as indicated by arrows 864 and 865, whereby to select a site according to ambient conditions.

Site selection server 811 may then, in response to the request 860, select a site, for example using received position data and any other data retrieved in response to the request. Details of the selected site may then be requested from site database 812 as indicated by arrow 867, received from sites database 812 as indicated by arrow 868 and returned to the advertisement server 814 as indicated by arrow 869. The advertisement server 814 may then serve an advertisement to one or more users as indicated by arrow 870. The serving of the advertisement may be achieved for example by advertisement server 814 sending a message to headset 801 containing the advertisement and identifying the selected site, to enable headset 801 to display the advertisement to the one or more users at the selected site.

Any other server such as SMS server 815 may request the selection of a site from site selection server 811 and this may be followed by a messaging flow similar to that described following request 860 from advertisement server 814. FIG. 9 shows a simplified messaging flow including request 875 from SMS server 815 to site selection server 811 which may include one or more user characteristics and position information, e.g. position B of FIG. 4, response 876 from site selection server 811 identifying a selected site, e.g. site 313, and the SMS server serving an SMS message to the user at the selected site as indicated by arrow 877, for example by sending to headset 801 the SMS text and the identity of the selected site to enable the headset 801 to display the SMS message to the user at the selected site.

Figure 10:
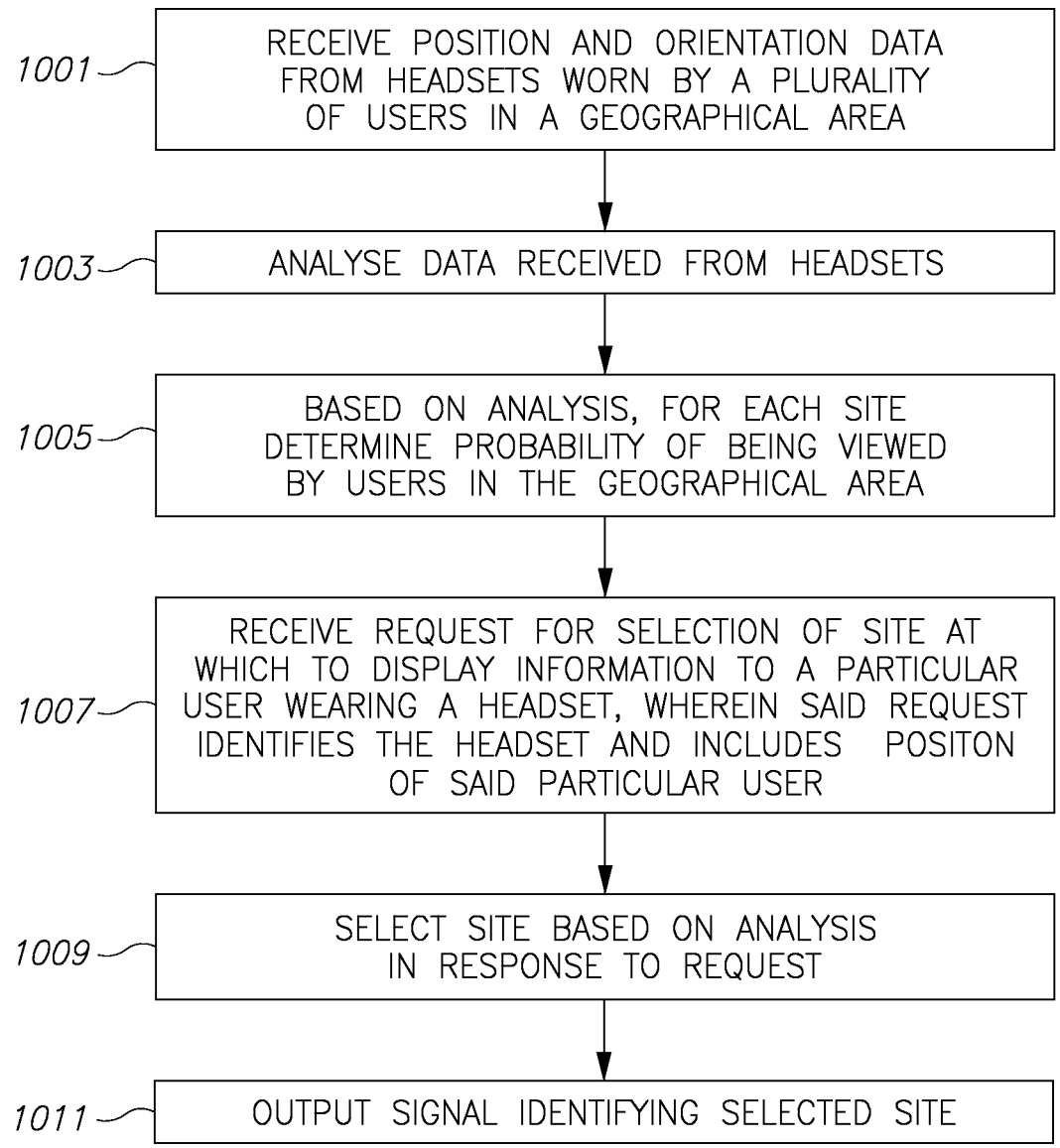
FIG. 10 is a flowchart of a method of selecting a site according to some embodiments of the invention.

FIG. 10 is a flow chart illustrating steps in a method according to some embodiments of the invention. The method of FIG. 10 may be performed at site selection server 811 for example. The operations shown in FIG. 10 need not be performed in the order shown. Similarly with any method described herein the operations need not be performed in the order described unless otherwise stated.

The method of FIG. 10 begins with operation 1001, the receipt of data from headsets worn by a plurality of users, such as headsets 801, 802, 803, in a geographical area such as the part of a city shown in FIGS. 3-7. This data may include headset position, orientation and optionally eye gaze direction data determined by one or more sensors or receivers comprised in a headset as described with reference to FIG. 1. The data may be received in one or messages similar to a message as indicated by arrow 851 in FIG. 9.

The received data may be analyzed at operation 1003. The analysis may be used to determine for each site the probability of the site being viewed by users in the geographical area at operation 1005.

At operation 1007 a request may be received for the selection of a site at which to display information to a particular user wearing a headset. The request may identify the headset and may include the position of the user, e.g. the position of the headset. The request may be received in a message similar to either of the messages indicated by arrows 860 and 875 shown in FIG. 9.

At operation 1009, in response to the request at operation 1007, a site may be selected. At operation 1011 a signal may be output identifying the selected site. The signal may be output in a message similar to that indicated by arrow 869 or 875 in FIG. 9.

The analysis of data received from headsets according to some embodiments of the invention may be used in various ways in addition to or alternative to the uses described in the foregoing. For example, according to some embodiments of the invention such data may be used to create a 2D or 3D representation of an area showing possible sites or viewing positions or both. For sites such a representation may indicate their visibility for example using areas or volumes such as volume 330 shown in FIG. 4. For viewing positions such a representation may indicate an envelope of visible sites such as shown in FIG. 5 for positions B and C. Data received from headsets may be used to identify "dead zones" in a geographical area. For example it is possible according to some embodiments of the invention to eliminate sites that are blocked and hence invisible using 3D map data. Such invisibility would not be time dependent. According to other embodiments of the invention, it is possible to identify sites that are never looked at by users, or are not looked at during certain times of the day or year, which may then be eliminated from consideration without the need to determine a viewing probability. For example such sites may be automatically allocated probability zero for times when they are not viewed. Similarly it is possible according to some embodiments of the invention to determine from analysis of data received from headsets one or more areas from which no site is visible.

It is also possible that a site may become popular as a result of information being displayed there. Thus embodiments of the invention may be used to determine the effectiveness of information in attracting the attention of users by comparing popularity of a site or viewing position with no information or some information displayed on a site with its popularity when some information or different information is displayed on it. This may be achieved by receiving feedback data identifying any of position, orientation and optionally eye gaze direction from a headset after information has been presented to a user. Such feedback data may be used to determine whether the popularity of a site depends on whether or what information is displayed on it or whether the popularity of a viewing position depends on whether or what displayed information is visible from that position. This dependence may be dependent on other factors such as but not limited to time, ambient conditions and user characteristics as described herein. Some embodiments of the invention may be used to determine the dependence of effectiveness on various other factors including site positioning such as but not limited to size and relative position on building (e.g. which floor), and factors relating to information presentation such as graphics refinements e.g. size of font. Thus according to embodiments of the invention some element of "displayed data awareness" may be included in data stored in a database for sites or viewing positions or both, and this may be displayed, for example on a monitor or screen, for the purpose of helping users to visualize the effectiveness of communication. For example it may be possible to demonstrate that moving an advertisement one floor up will increase popularity by 10%, or enlarging the fonts by 20% increase popularity by 40%.

A database compiled from information received from headsets according to some embodiments of the invention may be queried to identify a popular site or viewing position and then to extract information relating to the site or position such as its visibility and details of users who viewed it.

The compilation of data relating to viewing positions as well as sites enables a cross check on a possible selection of a site. For example the selection of a site based on viewing data may be verified using PVP data or vice versa.

The compilation of data relating to paths taken and sites viewed by users may be useful according to some embodiments of the invention to predict a position or orientation or eye gaze direction of a user. Thus references herein to position, orientation and eye gaze direction include predicted position, predicted orientation and predicted gaze direction.

Unless otherwise stated, the features of embodiments of the invention described herein may be used interchangeably in any combination. A method or system feature described with reference to one embodiment may be used in any other embodiment.

Figure 11:
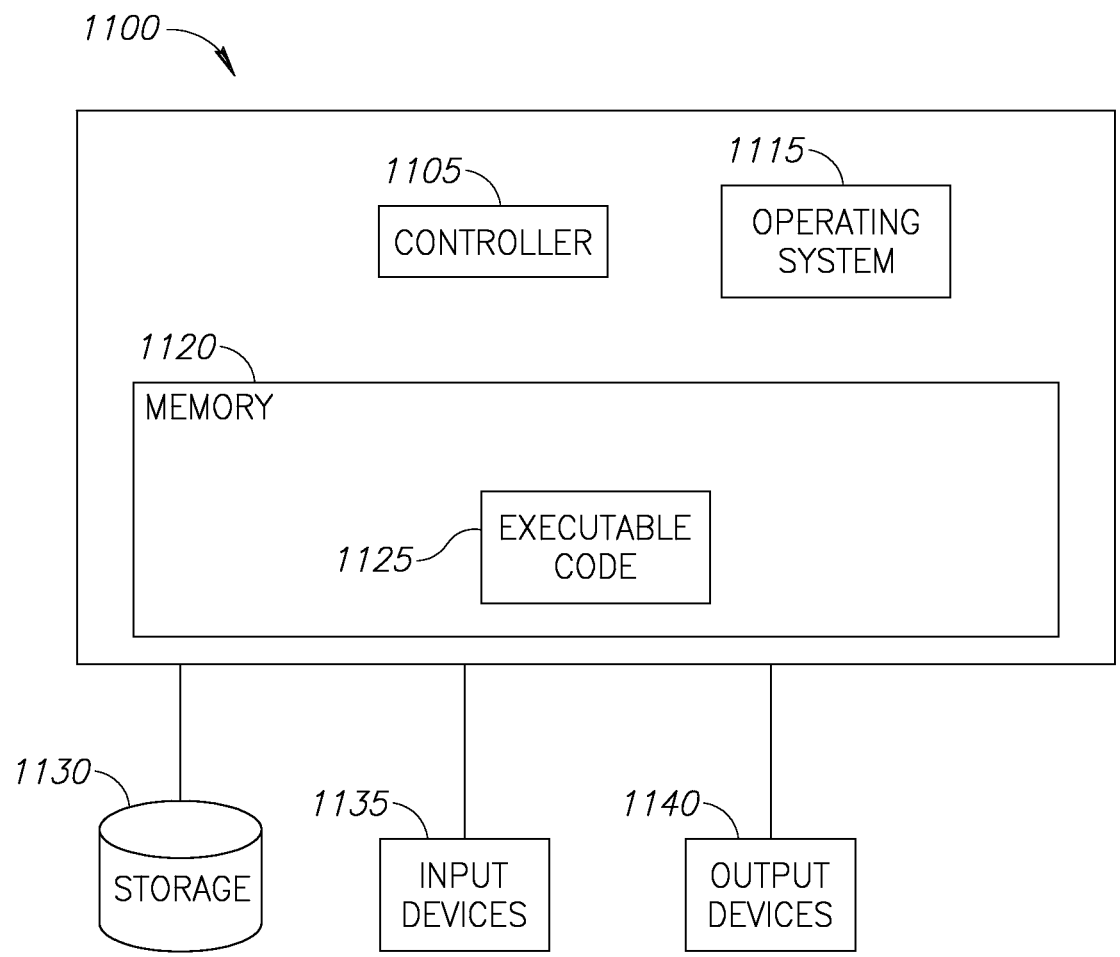
FIG. 11 is a block diagram of an exemplary computing device according to embodiments of the present invention.

The functions of any of the servers 811, 814, 815, 816 and databases 812, 813 817 may be implemented in any known computing system, one example of which is described for completeness with reference to FIG. 11.

Computing device 1100 may include a controller 1105 that may be, for example, a central processing unit processor (CPU), a chip or any suitable computing or computational device. Computing system 1100 may further comprise an operating system 1115, a memory 1120, a storage 1130, input devices 1135 and output devices 1140. Thus the CPU may perform the function of any of the processors mentioned herein.

Operating system 1115 may be or may include any code segment designed and/or configured to perform tasks involving coordination, scheduling, arbitration, supervising, controlling or otherwise managing operation of computing device 1100, for example, scheduling execution of programs. Operating system 1115 may be a commercial operating system.

Memory 1120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 1120 may be or may include a plurality of, possibly different memory units.

Executable code 1125 may be any executable code, e.g., an application such as the server or client applications described above, a program, a process, task or script. Executable code 1125 may be executed by controller 1105 possibly under control of operating system 1115. Where applicable, executable code 1125 may carry out operations described herein in real-time. In some embodiments, more than one computing device 1100 may be used. For example, a plurality of computing devices that include components similar to those included in computing device 1100 may be connected to a network and used as a system.

Storage 1130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Thus for example 3D map database 817 or site database 812 at site selection server may be comprised in storage such as storage 1130.

Input devices may include any kind of input device. A headset according to embodiments of the invention may include a touch input device or other user interface. Output devices 1040 may include displays in headsets and/or any other suitable output devices.

FIG. 12 is a schematic diagram illustrating the determination of gaze direction and attention range according to some embodiments of the invention. In FIG. 12 the circles 1201 and 1202 represent the eyes of a user and the arrow 1203 represents the LOS as might be determined by IMU 220. Two buildings 1205 and 1206 are in the LOS of the user. In this example building 1205 partially blocks building 1206 in a similar manner to the way building 302 partially blocks building 301 in FIG. 3. The probability of sites on buildings 1205 and 1206 being viewed by users may be determined by analyzing LOS data, e.g. orientation data, received from headsets worn by users. In a method according to some embodiments of the invention it might be assumed that the nearer site is more likely to be viewed than the site which is further away and therefore a weighting factor may be used in the probability determination relating to the distance of the site from the user. As described elsewhere herein, the probability determination may also take into account the time during which the LOS of a user was in the direction of a site, for example whether the time duration was above a predetermined threshold. It should be noted here that LOS may be determined as a vector, or direction. It does not determine a point on which the user's gaze is settled.

According to some embodiments of the invention, the determination of viewing probability may be enhanced with the use of data from an eye position sensor.

An eye position sensor may sense movements of the eyes of the user, for example rotational movements, in order to estimate the distance at which the user's gaze is focused. This is indicated in FIG. 12 where the long-dashed lines indicate the direction of each eye and intersect at a radial distance R1 thereby suggesting that the user's attention is on building 1206. Similarly, the dotted lines indicate that the user's gaze is focused on building 1205 at a second radial distance R2.

According to some embodiments of the invention a focus or attention range may be determined from eye position sensing signals, which may for example define a depth of field "slice" with a maximum and minimum radius from the user. For example it is possible to determine the distance at which a user is focusing to within a few meters. This may be sufficient to determine which one of a number of possible sites along the LOS was looked at by a user. Therefore as indicated in table 1 a database containing data relating to sites may include a measure of popularity based on attention range data as an optional extra, or refinement, of popularity based on LOS data.

An eye position sensor may also sense movements of the eyes of a user in order to estimate the direction in which the user is looking, for example in terms of deviation from straight ahead, for example at the same time as determining attention range. This is indicated in FIG. 12 where the short-dashed lines indicate that the user's gaze is focused on a point 1207 at a radial distance R3 from the user in a direction deviating from the LOS by an angle a which is a measure of the binocular divergence. As indicated in table 1 a database containing data relating to sites may include a measure of popularity based on eye gaze direction as an optional extra, or refinement of popularity based on LOS data. It will be apparent from FIG. 12 that determination of attention range is especially useful when the gaze direction and LOS are coincident. Where the gaze direction deviates from the LOS, measurement of gaze direction may also entail determining a focus point or range.

In practice the determination of gaze direction may be more difficult than determination of LOS because the eyes are able to move rapidly and the gaze direction may appear to wobble. In order to save on power and processing requirements it may be desirable not to output from a sensor or a headset all of the signals generated by an eye position sensor. Therefore some embodiments of the invention relate to the collection and reporting of signals from an eye position sensor. This may be used to control the amount of data reported by eye tracking sensors 122 to a controller 230, from controller 230 to data communication unit 225, or from data communication unit to a server, or between any components in a system according to some embodiments of the invention. For example according to some embodiments of the invention, LOS data and gaze direction data may be combined to determine an "attention depth" which may define a depth of field slice in a similar manner to focus depth.

The head LOS may be determined by an independent coordinate system, for example using an IMU 220. The eye gaze direction may move with the head LOS, or it may be stabilized as a result of the vestibular ocular reflex which may cause eye movements to compensate for movements of the head. In practice, a mixture of both may take place, all of which contributes to the complexity of determining the popularity of a site.

Figure 13:
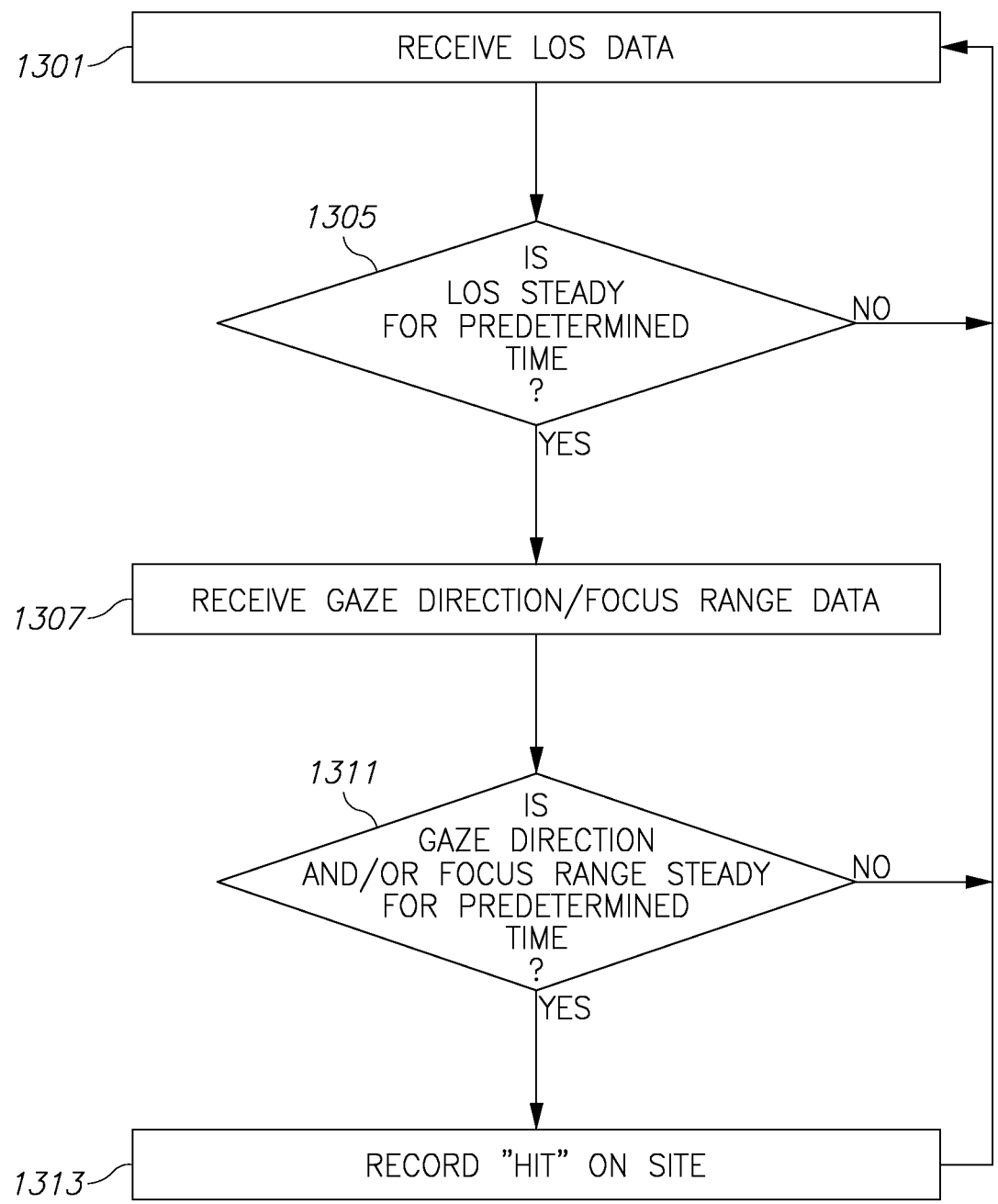
FIG. 13 is a flow chart of a method of collecting headset data according to some embodiments of the invention.

FIG. 13 shows a flowchart of a method of collecting headset data according to some embodiments of the invention. Depending for example on the capability of components in a headset, some or all of the method of FIG. 13 may take place in any component including but not limited to IMU 220, controller 230, data communication unit 225 and a server or other remote computing system with which the HMD 100 may communicate such as site selection server 811.

The flow of FIG. 13 may be used to identify a new site, for example to be added to a site database. The flow may begin with receiving LOS data at operation 1301.

The flow continues to operation 1305 where it is determined whether the LOS is steady for a predetermined time. In the affirmative, according to some embodiments of the invention, the flow may proceed to operation 1313 where a "hit" is recorded for the at least one site. In such embodiments the viewing probability for a site, and hence suitability to be added to a database, may be determined on the basis of at least some LOS data without additional data from e.g. an eye position sensor. As noted elsewhere herein, according to some embodiments of the invention, different kinds of data relating to a viewing of a site may be weighted differently. Thus for example LOS data without additional data may be weighted lower than other data which is for example associated with a higher level of confidence.

According to some embodiments of the invention, the flow continues to operation 1307 at which data relating to gaze direction and/or attention range is received, for example from eye tracking sensors 122. The flow then continues to operation 1311 where it is determined whether the gaze direction and/or attention range are steady for a predetermined time and if so the flow continues to operation 1313 where a "hit" is recorded for that eye gaze direction. A "hit" recorded on the basis of data from an eye position sensor may be determined to have a higher confidence level than a "hit" recorded on the basis of LOS information alone and may therefore be given higher weighting in determining viewing probability.

One or both of operations 1305 and 1311 may include some smoothing of received LOS or gaze direction or attention range data depending on its accuracy, for example to eliminate minor oscillations, fluctuations or vibrations that are not indicative of the gaze drifting. Methods of performing such smoothing will be familiar to one skilled in the art.

The "hit" may be reported to a site selection server 811 or other computing system, together with the associated LOS data, for analysis in order to identify new sites to be added to a site database such as site database 812. If the "hit" is received together with user input it might be identified as a site to be used for a particular user or group of users as described further herein. If the "hit" is reported automatically from a headset it might be used together with similar reports from other user equipment to identify a site and its viewing probability, or parameters for determining its viewing probability, to be added to site database 812.

The recordal of "hits" according to methods described with reference to FIG. 13 may be used to determine a viewing probability for sites identified as the subject of a hit, e.g. having been looked at for more than a predetermined time. Any predetermined time may be chosen and modified based on experience. A suitable initial predetermined time for either operation 1305 or 1309 might be ten seconds for example. The recordal of hits, if not performed at the site selection server 811, may be transmitted to the site selection server and used in analysis to determine viewing probability.

Figure 14:
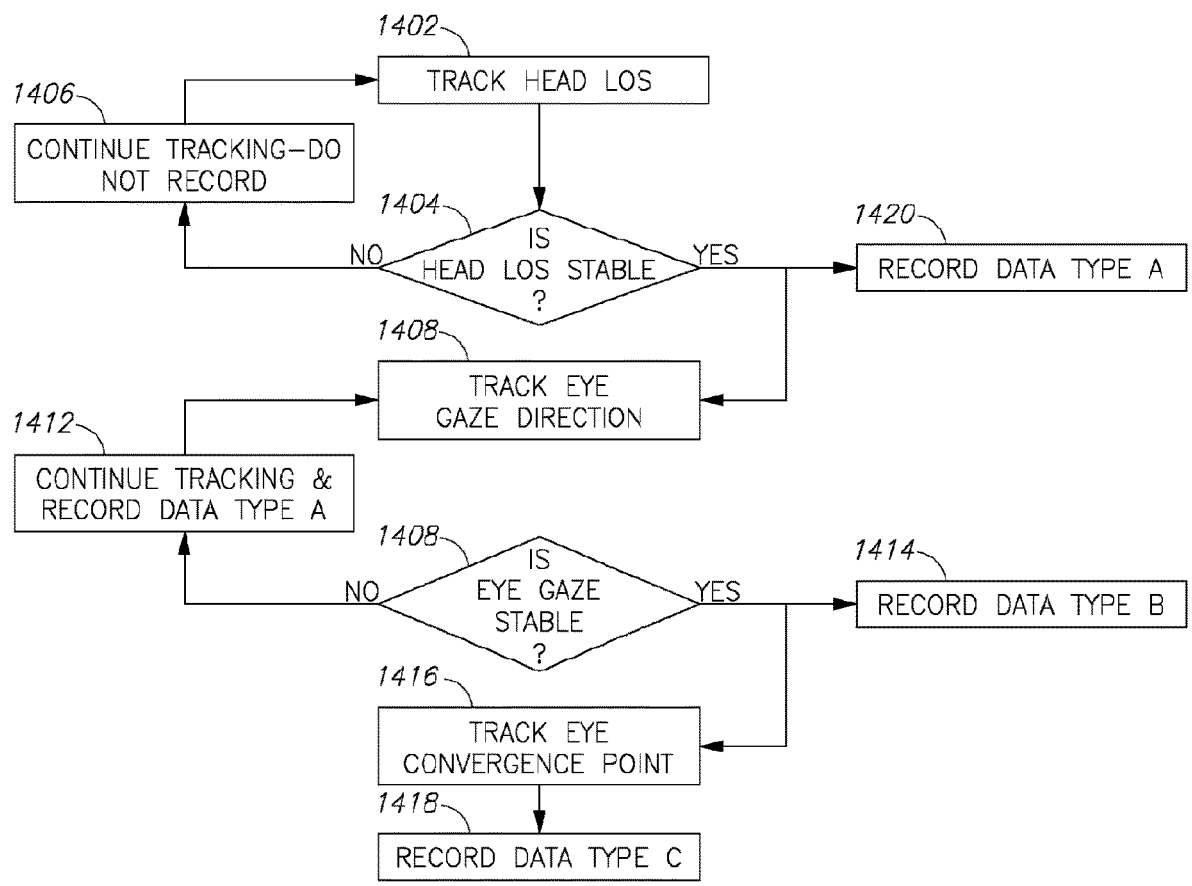
FIG. 14 illustrates a method of collecting headset data according to some embodiments of the invention.

According to some embodiments of the invention, data relating to the popularity of a site may be stored with an associated level of accuracy, or confidence, depending on how the data was derived. FIG. 14 illustrates an alternative method according to some embodiments of the invention in which tracking data used to determine the popularity of sites may be recorded with different levels of accuracy, depending on how the viewing of a site is sensed or determined. As with the method of FIG. 13, some or all of the method of FIG. 14 may take place in any component including but not limited to IMU 220, controller 230, data communication unit 225 and a server or other remote computing system with which the HMD 100 may communicate such as site selection server 811.

The level of accuracy may be taken into account when determining the popularity or visibility of a site, and hence the probability that it will be looked at by a user. For example, a popularity, visibility or other variable relating to a site may be associated with a confidence measure for example depending on the accuracy or quality of the data that was used to determine it. Additionally or alternatively, data used to determine popularity, visibility or some other variable relating to a site may be weighted according to its accuracy when making the determination. Thus, for example, if the variable such as popularity is determined from a sum of "hits" on a site as discussed herein, the sum may be weighted according to what data was used to determine the "hit".

The level of accuracy of a determination that a site was looked at may be different depending on which of LOS, eye gaze direction and eye convergence data were used in determining whether a site has been looked at by a user, for example for longer than a predetermined time. It will be appreciated that other methods which also take some or all of these movements into account are possible according to embodiments of the invention as are methods which take into account other factors when determining whether a user looked at a site. The method of FIG. 14 uses three levels of accuracy, or categories, and thus collected data may be categorized according to some embodiments of the invention. More or fewer categories may be used in some embodiments of the invention:

Type A: based only on the head LOS (direction and stabilization), for example as determined by an IMU—this may indicate the general direction in which the user is looking at and the time on target (stabilized on a direction)

Type B: Based on user head LOS plus eye gaze direction, for example as determined by an eye tracking sensor—this may indicate whether the user's attention is currently fixed in a direction although the head LOS may move Type C: Adding the eye convergence point, or attention range, which also may be determined by an eye position sensor, will add depth information to direction and stabilization achieved in Type B and may indicate a point in space stabilized for a duration of time.

Thus according to some embodiments of the invention, the popularity indications included in table 1 may be associated with different confidence values depending on the data on which they are based.

The operations illustrated in FIG. 14 may commence with tracking the head LOS at operation 1402 for example using an IMU 220. At operation 1404 it may be determined whether the head LOS is or stable, for example by determining whether the head LOS has remained stationary within a predetermined tolerance threshold for more than a predetermined threshold (TH) period t1. If not, the flow may proceed to operation 1406 where the tracking of information continues but LOS data is not recorded.

If the head LOS is stable, e.g. stationary for longer than t1, the flow may continue to operation 1420 where LOS data is recorded, for example to determine a "hit" in a similar manner to that described with reference to FIG. 13. This data may be recorded with an associated level of accuracy or confidence, indicated in FIG. 14 as Type A. In addition the flow may continue to operation 1408 where the eye gaze direction may be tracked, for example using an eye tracking sensing as described herein. At operation 1410 it may be determined whether the eye gaze direction is stable, e.g. stationary for more than a predetermined threshold period t2. If not, the flow may continue to operation 1412 where tracking of eye movements continues. At this stage since the gaze is not stationary, any data recorded may be noted to be Type A.

If the eye gaze direction is stationary for longer than t2 the flow may continue to operation 1414 where data derived from eye tracking sensors is recorded, for example as Type B indicating higher accuracy or confidence.

Further, if it is determined at operation 1410 that the eye gaze direction is stable, then may be is determined to be worthwhile to examine the attention range from tracking of the eye convergence point at operation 1416. Eye convergence data may be recorded at operation 1418 and may be deemed to be more accurate or have a higher confidence level than LOS or eye gaze direction data and noted to be Type C. Eye convergence is generally more stable than eye gaze and LOS. Nevertheless, according to some embodiments of the invention, an additional decision, similar to operations 1404 and 1410, may occur between operations 1416 and 1418.

Data used to determine a variable relating to a site may be weighted in other ways. According to some embodiments of the invention, such data may be analyzed to infer characteristics of the site. For example analysis of consistency of data from different users may lead to the conclusion that a site is inherently "noisy". Thus according to some embodiments of the invention, data relating to the viewing of a site may be weighted, for the purpose of determining probability, by a factor which depends on the site itself. For example viewing of a more "noisy" site, e.g. one for which data from multiple users is not consistent, may be weighted lower than a less noisy site. The weighting may be according to a measure of consistency. According to some embodiments of the invention, the accuracy of a new data may be used for weighting the new state for use in e.g. a Kalman filter to be used to determine a viewing probability.

It will be appreciated that methods according to embodiments of the invention, in which a decision is taken whether or not to record data relating to the viewing of a site, may serve to save on memory capacity and/or processing power and hence prolong battery life. According to some embodiments of the invention, for example where memory and/or power are unlimited, a larger proportion or all of the data from one or more components in a headset may be captured and recorded and filtering, for example to remove data when a user's head or eyes are moving rapidly, may be filtered by a post-recording processing or filtering method.

A decision whether or not to record data as described herein may be automatic, for example according to one or more algorithms, for example running in controller 230. Thus for example data may be recorded only when a known or predetermined site is in a user's LOS, or only when the LOS is stable as described with reference to FIGS. 13 and 14. According to some embodiments of the invention the recordal of data derived from one or more components in a headset may be triggered in any other way. For example, a user may have the ability to trigger the recordal of data. Thus some embodiments of the invention may include receiving user input, for example from the user input device 255 at the controller 230, and commencing recording of data from one or both of the IMU 220 and eye position sensors 122 or sensing component in the headset 100 in response to user input. Thus for example if a user witnessed an event which might affect the instant popularity of a site or require data to be communicated to other users in a geographical area, the user might be able to trigger the recording of data. Such data could be "tagged", for example automatically, as user triggered, and might for example be used to identify a new, possibly temporary site, at which to display information to users, for example escape information in the event of an emergency.

User input may be in any form such as but not limited to a voice command or a tactile event may trigger an event indicating an important/interesting site in the current LOS of the user. A user indicated site may be a temporal site indicating an important event currently happening at this moment such as a car accident or any other real time event at a site.

A user indicated site may be a general or social site important to the user or to a group of users on which a user or group of users wish to have information displayed to them. For example the general site may be a building hosting a store along the user's route to work, the user would like to indicate that this building is an important site and wishes to receive data displayed (AR) on that site which may be connected to something of specific interest, e.g. to that user. For example the store may be bicycle shop and the data the user is interested to receive may be sale data when it occurs on the building when his LOS will pass along that building. The site may be communicated to a site selection server 811 to be added to a site database 812. The user may connect or associate this site to a contact or list of contacts, for example members of a cycling group to indicate that site is relevant to this group. This association may be communicated to the site selection server. In this case the site may receive or be associated with tagged data at the database 812 relevant to different social groups to allows to communication between the group based on site, LOS and group connectivity.

In another example a chess or other game or interaction may be initiated between two users passing a building or other site, which was indicated as a site interesting by both users. The users may conduct a chess game on the same site. For example when either user is passing by that site with LOS intersecting the site the HMD will show the game status and allow users them to play their turn. This is another example of the site being a social site indicated by group of users.

Figure 15:
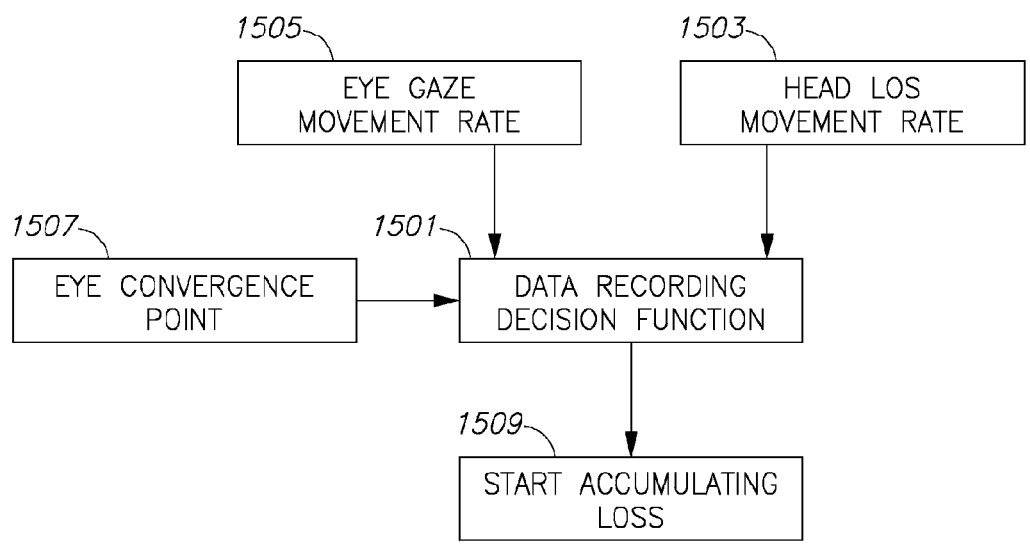
FIG. 15 illustrates a flowchart according to some embodiments of the invention.

According to some embodiments of the invention, a data recording decision function may be implemented at a headset to perform one or more operations on signals received from one or more sensors. Such operations may include but are not limited to one or more of analysis, processing and filtering. This is illustrated in FIG. 15 which is a schematic diagram illustrating the operation of computer architecture that may be used to implement such a function. This may be implemented by an algorithm operating at a processor forming part of controller 230. The architecture of FIG. 15 includes a data recording decision module 1501 which receives inputs including one or more of head LOS movement rate 1503, eye gaze movement rate 1503 and eye convergence point 1507. These inputs may have been derived from signals from an IMU 220 or eye tracking sensor.

Module 1501 may implement a decision function such that LOS data is only accumulated when the LOS movement rate 1503 satisfies a condition such as being below a predetermined threshold. Module 1501 may additionally or alternatively implement a decision function such that data from eye position sensing is only accumulated when one or both of the eye convergence point and the eye gaze movement rate satisfy a condition such as the eye gaze movement rate being below a predetermined threshold.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element unless otherwise stated.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention.

The invention claimed is:

1. A method of selecting a site within a scene for displaying information to a user via a head-mounted device "HMD" in a geographical area, wherein the geographical area includes a plurality of sites at which information may be displayed, the method comprising:
   receiving continuous position and orientation data from said HMD worn by a plurality of users in the geographical area;
   analyzing said data and determining the probability of sites being viewed by users in said geographical area, based on said analysis;
   filtering the selection of sites based on the determined probabilities;
   receiving a request for a selection of a site, based on said filtering, at which to display information to a particular user, wherein said request includes continuous position and orientation data relating to said particular user; and
   in response to said request, selecting a site based on said analysis,
   wherein said analyzing comprises identifying one or more viewing positions from which one or more of said plurality of sites is visible, and
   wherein said identifying one or more positions frequented by said plurality of users comprises tracking paths travelled by users in said plurality of users, identifying path intersections, and identifying one or more intersections as a position frequented by said plurality of users.

2. The method of claim 1 comprising displaying information to said particular user via a display in the HMD of the particular user.

3. The method of claim 1 wherein said analysing comprises determining one or more parameters for one or more of said plurality of sites, wherein said one or more parameters comprise one or both of:
a measure of the popularity of each site of said plurality of sites in terms of number or frequency of users who look at the site for longer than a predetermined duration, and an area or volume from which the site is visible.

4. The method of claim 1 wherein said identifying one or more viewing positions comprises detecting each look at one of said plurality of sites longer than a predetermined duration, determining a position corresponding to each detected look and identifying each determined position as a viewing position.

5. The method of claim 1 wherein said identifying one or more viewing positions comprises identifying one or more positions frequented by said plurality of users, determining whether a site is visible from each identified frequented position, and identifying each frequented position from which a site is determined to be visible as a viewing position.

6. The method of claim 1 comprising determining one or more parameters for one or both of:
one or more of said plurality of sites and
one or more of said viewing positions,
and storing said determined parameters in a database.

7. The method of claim 1 comprising determining one or more parameters for one or more of said viewing positions, wherein said one or more parameters comprise one or both of a measure of the popularity of one or more of said viewing positions in terms of number or frequency of users who stand at a viewing position for longer than a predetermined time, a volume containing sites of said plurality of sites that are visible from said viewing position.

8. The method of claim 1 comprising receiving one or more characteristics describing each of said plurality of users wherein said selecting is also based on said one or more characteristics.

9. A method of selecting a site within a scene for displaying information to a user via a head-mounted device "HMD" in a geographical area, wherein the geographical area includes a plurality of sites at which information may be displayed, the method comprising:
receiving continuous position and orientation data from said HMD worn by a plurality of users in the geographical area;
analyzing said data and determining the probability of sites being viewed by users in said geographical area, based on said analysis;
filtering the selection of sites based on the determined probabilities;
receiving a request for a selection of a site, based on said filtering, at which to display information to a particular user, wherein said request includes continuous position and orientation data relating to said particular user;
selecting a site based on said analysis in response to said request; and
receiving additional data relating to any of temporal parameters, ambient conditions and meteorological conditions wherein said selecting is also based on any of said additional data.

10. A method of selecting a site within a scene for displaying information to a user via a head-mounted device "HMD" in a geographical area, wherein the geographical area includes a plurality of sites at which information may be displayed, the method comprising:
receiving continuous position and orientation data from said HMD worn by a plurality of users in the geographical area;
analyzing said data and determining the probability of sites being viewed by users in said geographical area, based on said analysis;
filtering the selection of sites based on the determined probabilities;
receiving a request for a selection of a site, based on said filtering, at which to display information to a particular user, wherein said request includes continuous position and orientation data relating to said particular user; and
selecting a site based on said analysis in response to said request,
wherein said analyzing comprises identifying one or more areas from which no site is visible.

11. A method of selecting a site within a scene for displaying information to a user via a head-mounted device "HMD" in a geographical area, wherein the geographical area includes a plurality of sites at which information may be displayed, the method comprising:
receiving continuous position and orientation data from said HMD worn by a plurality of users in the geographical area;
analyzing said data and determining the probability of sites being viewed by users in said geographical area, based on said analysis;
filtering the selection of sites based on the determined probabilities;
receiving a request for a selection of a site, based on said filtering, at which to display information to a particular user, wherein said request includes continuous position and orientation data relating to said particular user; and
selecting a site based on said analysis in response to said request,
wherein said analyzing comprises identifying one or more viewing positions from which one or more of said plurality of sites is visible, and
wherein said analyzing comprises detecting a rate of change of frequency above a predetermined threshold of one or both of users who stand at a viewing position for longer than a predetermined time and users who look at a site for longer than a predetermined duration, said request is initiated in response to said detecting.

12. A method of selecting a site within a scene for displaying information to a user via a head-mounted device "HMD" in a geographical area, wherein the geographical area includes a plurality of sites at which information may be displayed, the method comprising:
receiving continuous position and orientation data from said HMD worn by a plurality of users in the geographical area;
analyzing said data and determining the probability of sites being viewed by users in said geographical area, based on said analysis;
filtering the selection of sites based on the determined probabilities;
receiving a request for a selection of a site, based on said filtering, at which to display information to a particular user, wherein said request includes continuous position and orientation data relating to said particular user;

selecting a site based on said analysis in response to said request and querying a 3D model of the geographical area to determine whether a user of a HMD viewed any of said plurality of sites.

13. A method of selecting a site within a scene for displaying information to a user via a head-mounted device "HMD" in a geographical area, wherein the geographical area includes a plurality of sites at which information may be displayed, the method comprising:

receiving continuous position and orientation data from said HMD worn by a plurality of users in the geographical area;

analyzing said data and determining the probability of sites being viewed by users in said geographical area, based on said analysis;

filtering the selection of sites based on the determined probabilities;

receiving a request for a selection of a site, based on said filtering, at which to display information to a particular user, wherein said request includes continuous position and orientation data relating to said particular user;

selecting a site based on said analysis in response to said request and creating a two or three-dimensional representation of an area showing said plurality of sites and one or more of:

an area or volume from which one or more of said plurality of sites is visible;

one or more areas from which no site is visible;

one or more viewing positions from which one or more of said plurality of sites is visible;

one or more viewing positions from which one or more of said plurality of sites is visible and for one or more of said viewing positions a volume containing sites of said plurality of sites that are visible from the viewing position.

14. A method of compiling information for use in selection of a site within a scene for displaying information to a user via a HMD in a geographical area including a plurality of sites at which information may be displayed, the method comprising:

receiving continuous position and orientation and data from said HMD worn by a plurality of users in the geographical area;

analyzing said data and determining the probability of sites being viewed by users in said geographical area, based on said analysis;

wherein said analyzing comprises;

identifying one or more viewing positions from which one or more of said plurality of sites is visible, determining and storing one or more parameters for one or more of said plurality of sites and one or more of said viewing positions, wherein said parameters include a measure of the popularity of each site of said plurality of sites in terms of number or frequency of users who look at the site for longer than a predetermined duration and a measure of the popularity of one or more of said viewing positions in terms of number or frequency of users who stand at a viewing position for longer than a predetermined time.

15. A method as claimed in claim 14 comprising comparing popularity of a site or viewing position with no information or some information displayed on a site with its popularity when some information or different information is displayed on the same site and determining whether the popularity of a site depends on what or whether information is displayed on it or whether the popularity of a viewing position depends on whether or what displayed information is visible from that position.

16. A method as claimed in claim 14 comprising receiving additional data comprising any of characteristics describing each of said plurality of users and additional data relating to any of temporal parameters, ambient conditions and meteorological conditions, wherein said measures of popularity depend on any of said additional data.

* * * * *